(12) United States Patent
Qureshi

(10) Patent No.: US 11,783,032 B2
(45) Date of Patent: Oct. 10, 2023

(54) SYSTEMS AND METHODS FOR PROTECTING CACHE AND MAIN-MEMORY FROM FLUSH-BASED ATTACKS

(71) Applicant: Georgia Tech Research Corporation, Atlanta, GA (US)

(72) Inventor: Moinuddin Qureshi, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 455 days.

(21) Appl. No.: 17/276,773

(22) PCT Filed: Sep. 17, 2019

(86) PCT No.: PCT/US2019/051393
§ 371 (c)(1),
(2) Date: Mar. 16, 2021

(87) PCT Pub. No.: WO2020/060965
PCT Pub. Date: Mar. 26, 2020

(65) Prior Publication Data
US 2021/0349995 A1    Nov. 11, 2021

Related U.S. Application Data

(60) Provisional application No. 62/732,188, filed on Sep. 17, 2018.

(51) Int. Cl.
*G06F 21/55* (2013.01)
*G06F 12/0802* (2016.01)
*G06F 12/0891* (2016.01)

(52) U.S. Cl.
CPC ........ *G06F 21/554* (2013.01); *G06F 12/0802* (2013.01); *G06F 12/0891* (2013.01); *G06F 2212/1052* (2013.01); *G06F 2221/034* (2013.01)

(58) Field of Classification Search
CPC ............... G06F 21/554; G06F 12/0802; G06F 2212/1052; G06F 2221/034;
(Continued)

(56) References Cited

U.S. PATENT DOCUMENTS 6,460,114 B1 * 10/2002 Jeddeloh ............... G06F 12/084
711/120
8,495,301 B1 * 7/2013 Alexander ............. G06F 13/28
710/22
(Continued)

OTHER PUBLICATIONS

Huh et al, "Coherence Decoupling: Making Use of Incoherence", Oct. 2004, ASPLOS '04, p. 97-106.*
(Continued)

*Primary Examiner* — Christopher A Revak
(74) *Attorney, Agent, or Firm* — Troutman Pepper Hamilton Sanders LLP; Ryan A. Schneider; Brandon M. Reed

(57) ABSTRACT

Disclosed herein are systems and methods for identifying and mitigating Flush-based cache attacks. The systems and methods can include adding a zombie bit to a cache line. The zombie bit can be used to track the status of cache hits and misses to the flushed line. A line that is invalidated due to a Flush-Caused Invalidation can be marked as a zombie line by marking the zombie bit as valid. If another hit, or access request, is made to the cache line, data retrieved from memory can be analyzed to determine if the hit is benign or is a potential attack. If the retrieved data is the same as the cache data, then the line can be marked as a valid zombie line. Any subsequent hit to the valid zombie line can be marked as a potential attack. Hardware- and software-based mitigation protocols are also described.

25 Claims, 13 Drawing Sheets

(58) Field of Classification Search
CPC ............. G06F 12/0808; G06F 12/0815; G06F 12/0817; G06F 12/082; G06F 12/0822; G06F 12/0824; G06F 12/0826; G06F 12/0828; G06F 12/0831; G06F 12/0833; G06F 12/0835; G06F 12/0837; G06F 12/0891
See application file for complete search history.

(56) References Cited

U.S. PATENT DOCUMENTS

| | | | | |
|---|---|---|---|---|
| 9,058,270 | B2* | 6/2015 | Cain, III | G06F 12/0815 |
| 9,436,603 | B1* | 9/2016 | Pohlack | G06F 21/556 |
| 9,740,616 | B2* | 8/2017 | Busaba | G06F 12/0817 |
| 2007/0083491 | A1 | 4/2007 | Walmsley et al. | |
| 2015/0370728 | A1 | 12/2015 | Yamada et al. | |
| 2016/0170889 | A1* | 6/2016 | Lee | G06F 12/0862 711/118 |
| 2017/0285976 | A1 | 10/2017 | Durham et al. | |
| 2019/0042417 | A1* | 2/2019 | Sukhomlinov | G06F 12/0891 |
| 2019/0042453 | A1* | 2/2019 | Basak | G06F 12/128 |
| 2019/0138448 | A1* | 5/2019 | Li | G06F 12/0868 |
| 2020/0034538 | A1* | 1/2020 | Woodward | G06F 12/0842 |
| 2022/0067154 | A1* | 3/2022 | Favor | G06F 9/3838 |
| 2023/0022096 | A1* | 1/2023 | Calciu | G06F 21/556 |
| 2023/0079210 | A1* | 3/2023 | Klimov | G06F 12/0877 711/118 |

OTHER PUBLICATIONS

Saileshwar et al, "Lookout for Zombies: Mitigating Flush + Reload Attack on Shared Caches by Monitoring Invalidated Lines", Jun. 6, 2019, Georgia Institute of Technology, p. 1-12.*
Lindqvist, "Dynamic Eviction Set Algorithms and Their Applicability to Cache Characterisation", Sep. 2020, Uppsala Universitet, p. 1-51.*
Ramkrishnan et al, "New Attacks and Defenses for Randomized Caches", Sep. 26, 2019, University of Minnesota, p. 1-23.*
Search Report and Written Opinion from Application No. PCT/US2019/051393 dated Dec. 5, 2019 (7 pages).
Wang, et al., "Leaky Cauldron on the Dark Land: Understanidng Memory Side Channel Hazards in SGX," Proceedings of 2017 ACM SIGSAC Conference on Computer and Communications Security https://acmccs.github.io/papers/p2421-wangA.pdf.
Saileshwar, et al., "Lookout for Zombies: Mitigating Flush+Reload Attack on Shared Caches by Monitoring Invalidated Lines," Computer Science Jun. 6, 2019 https://arxiv.org/pdf/1906.02362.pdf.

* cited by examiner

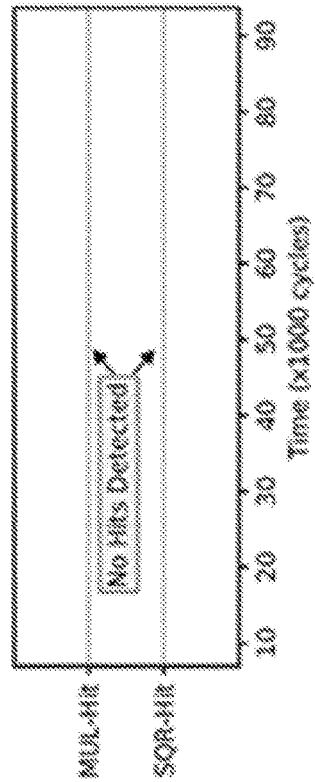
FIG. 13a
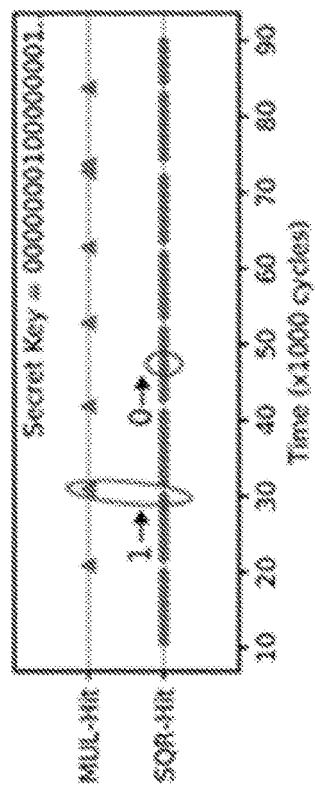
FIG. 13b
FIG. 13c

SYSTEMS AND METHODS FOR PROTECTING CACHE AND MAIN-MEMORY FROM FLUSH-BASED ATTACKS

CROSS REFERENCE TO RELATED APPLICATIONS

This application claims the benefit of U.S. Provisional Application Ser. No. 62/732,188, filed on Sep. 17, 2018, which is incorporated herein by reference in its entirety as if fully set forth below.

FIELD OF THE DISCLOSURE

The present disclosure relates generally to systems and methods for protecting memory from Flush-based attacks. Particularly, embodiments of the present disclosure relate to creating zombie bits in a cache line, preserving the zombie lines in the cache, and using cache hits and misses at the zombie line to detect and mitigate Flush-based attacks.

BACKGROUND

Caches alleviate the long latency of main memories by providing data with low latency. Unfortunately, the timing difference between the cache-hit and a cache-miss can be used as a side-channel by an adversary to infer the access pattern and obtain unauthorized information from the system. The recently disclosed Spectre and Meltdown vulnerabilities rely on such cache-based side channels to convert the unauthorized data value into discernible information. While cache attacks have been demonstrated in the past at a smaller scale, the recent vulnerabilities show that cache attacks can affect hundreds of millions of processor systems and highlight the need to develop efficient solutions to mitigate cache attacks.

At the same time, it is also important to preserve the benefits of the performance optimizations that oftentimes cause these side-channels. Operating system (OS)-based page sharing is one such optimization commonly used in modern systems to avoid redundant copies of pages across applications (such as for library code) or for having multiple copies of the same data pages (by de-duplication of data pages). Such sharing allows different programs accessing the same library code to get routed to the same OS page. While OS-based page sharing is beneficial for memory capacity, such sharing leads to cache side channels between applications, even though the pages are shared only in read-only mode.

One type of attack that is benefits from OS-shared pages between an attacker and a victim is the Flush+Reload attack. Flush+Reload attacks take advantage of modern computing architectures to access secret information. Modern processors, for example, pack multiple cores on a single chip and tend to keep the level-1 (L1) and level-2 (L2) caches private to the core. However, the last-level cache (LLC) is typically shared between all the cores to efficiently utilize the cache space. Unfortunately, such sharing makes the LLC vulnerable to the Flush+Reload attacks. The typical flow for these attacks includes a spy program flushing a shared line of cache using a clflush instruction. The spy program can then wait until the victim program accesses the shared line. This access will miss in the cache and the cache controller will then retrieve the data for the shared line. The spy program can then access the shared line and measure the time for the access to determine if the victim accessed the line during the waiting period. The spy can use the patterns of hits and misses to infer secret information of the victim.

Prior solutions that are highly effective at guarding the cache against conflict-based attacks (such as Prime+Probe) become ineffective for Flush-based attacks, as the attacker can precisely invalidate a given line from the cache without relying on any conflicts. Current systems and methods to mitigate Flush-based cache attacks primarily rely on OS-based or software-based techniques. For example, cache attacks on shared data can be avoided by disabling sharing of critical pages or by dynamically replicating shared pages. Other methods suggest rewriting critical applications with transactional memory semantics in order to avoid leakage of timing information to concurrently running applications. None of these prior systems and methods are ideal, however. The optimizations of page sharing are valuable in many cases, and disabling such optimizations is not an ideal approach. Additionally, rewriting entire applications to avoid leakage of information is not efficient or desirable.

What is needed, therefore, is a system and method that can efficiently identify and mitigate such attacks while also retaining page sharing, avoiding rewriting the victim applications, and avoiding reliance on profile information.

BRIEF SUMMARY OF THE INVENTION

Embodiments of the present disclosure address this need as well as other needs that will become apparent upon reading the description below in conjunction with the drawings. The present disclosure relates generally to systems and methods for protecting memory from Flush-based attacks. Particularly, embodiments of the present disclosure relate to creating zombie bits in a cache line, preserving the zombie lines in the cache, and using cache hits and misses at the zombie line to detect and mitigate Flush-based attacks.

An example of the present disclosure describes a method for identifying a side-channel attack on a cache line. The method can include providing a zombie bit in the cache line of a cache. The cache line can include a cache tag, cache data, and a valid bit. In an initial state, the valid bit can be marked valid and the zombie bit can be marked invalid. The method can include receiving a flush-caused invalidation at the cache line. In response to the flush-caused invalidation, the method can include marking the valid bit as invalid and marking the zombie bit as valid. This can identify the cache line as an invalid zombie line. The method can include receiving a first access request at the invalid zombie line. The method can include receiving second data from a memory. In response to receiving the second data, the method can include either of the following. When the second data is different than the cache data, the method can include marking the valid bit as valid and marking the zombie bit as invalid. When the second data is equal to the cache data, the method can include marking the valid bit as valid, thereby creating a valid zombie line. The method can include receiving a second access request at the valid zombie line. The method can include identifying the valid zombie line as under attack, for example if the second access request is at the valid zombie line.

In any of the embodiments described herein, the method can include identifying, via a signal associated with the cache, whether the flush-caused invalidation is caused by a clflush instruction.

In any of the embodiments described herein, the method can include preventing, using a cache replacement policy, the invalid zombie line from being preferentially replaced by a replacement algorithm.

In any of the embodiments described herein, subsequent to receiving the second access request at the valid zombie line, the method can include providing a latency period. After the latency period has passed, the method can include returning the cache data to a processor.

In any of the embodiments described herein, the method can include not installing the second data in the cache.

In any of the embodiments described herein, the method can include tracking, by a hardware counter, a number of times the valid zombie line receives the second access request and any subsequent access request.

In any of the embodiments described herein, the method can include tracking, by a hardware counter, a number of times the cache line receives the flush-caused invalidation and any subsequent flush-caused invalidations.

In any of the embodiments described herein, the method can include tracking, by a first hardware counter, a number of times the cache line receives the flush-caused invalidation and any subsequent flush-caused invalidations; and the method can include tracking, by a second hardware counter, a number of times the valid zombie line receives the second access request and any subsequent access request.

In any of the embodiments described herein, the method can include comparing (1) the number from the second hardware counter to (2) the number from the first hardware counter. When the two numbers are not equal, the method can include transmitting a notification to an operating system indicating the cache line is under attack.

In any of the embodiments described herein, the first hardware counter can be associated with a first core, the second hardware counter can be associated with a second core, and the notification can include information identifying the first core.

In any of the embodiments described herein, the first hardware counter can be associated with a first core and the second hardware counter can be associated with a second core. The method can include isolating the first core in a first memory domain. The method can include isolating the second core in a second memory domain. The second memory domain can be separate from the first memory domain.

In any of the embodiments described herein, the first hardware counter can be associated with a first core and the second hardware counter can be associated with a second core. The method can include isolating the first core in a first time-slice. The method can include isolating the second core in a second time-slice. The second time-slice can be different than the first time-slice.

In any of the embodiments described herein, the method can include comparing (1) the number from the second hardware counter to (2) the number from the first hardware counter. When a difference between the two numbers reaches a predetermined threshold, the method can include transmitting a notification to an operating system indicating the cache line is under attack.

In any of the embodiments described herein, the first hardware counter can be associated with a first core, the second hardware counter can be associated with a second core, and the notification can include information identifying the first core.

In any of the embodiments described herein, the first hardware counter can be associated with a first core and the second hardware counter can be associated with a second core. The method can include isolating the first core in a first memory domain. The method can include isolating the second core in a second memory domain. The second memory domain can be separate from the first memory domain.

In any of the embodiments described herein, the first hardware counter can be associated with a first core and the second hardware counter can be associated with a second core. The method can include isolating the first core in a first time-slice. The method can include isolating the second core in a second time-slice. The second time-slice can be different than the first time-slice.

Another example of the present disclosure describes a cache memory system. The system can include a memory. The system can include a shared cache level comprising a cache line. The cache line can include a zombie bit marked invalid by default, a cache tag, cache data, and a valid bit marked valid by default. The system can include a cache controller. The cache controller can be configured to mark the valid bit as invalid in response to a flush-caused invalidation. The cache controller can be configured to mark the zombie bit as valid in response to the flush-caused invalidation, thereby identifying the cache line as an invalid zombie line. The cache controller can be configured to detect a first access request at the invalid zombie line. The cache controller can be configured to retrieve second data from the memory. The cache controller can be configured to compare the second data to the cache data. The cache controller can be configured to mark the valid bit as valid when the second data is equal to the cache data, thereby creating a valid zombie line. The cache controller can be configured to detect a second access request at the valid zombie line. The cache controller can be configured to identify the valid zombie line as under attack.

In any of the embodiments described herein, the cache controller can be configured to mark the valid bit as valid when the second data is different than the cache data. The cache controller can be configured mark the zombie bit as invalid when the second data is different than the cache data.

In any of the embodiments described herein, the cache controller can be further configured to identify whether the flush-caused invalidation is caused by a clflush instruction. For example, a cache line hierarchy can be equipped with signals to identify if the invalidation is caused due to clflush.

In any of the embodiments described herein, the cache controller can be further configured to prevent the invalid zombie line from being preferentially replaced by a replacement algorithm. For example, the cache replacement policy can be modified to treat an invalid zombie line similar to a valid line, and evict the line only when the line would have been naturally evicted from the cache, as if it had not received an FCI.

In any of the embodiments described herein, the cache controller can be further configured to provide a latency period between after the second access request at the valid zombie line. After providing the latency period, the cache controller can return the cache data to a processor.

In any of the embodiments described herein, the cache controller can refrain from installing the second data in the cache line.

In any of the embodiments described herein, the system can include a hardware counter configured to count a number of times the valid zombie line receives the second access request and any subsequent access request.

In any of the embodiments described herein, the system can include a hardware counter configured to count a number of times the cache line receives the flush-caused invalidation and any subsequent flush-caused invalidations.

In any of the embodiments described herein, the system can include a first hardware counter configured to count a number of times the cache line receives the flush-caused invalidation and any subsequent flush-caused invalidations. The system can include a second hardware counter configured to count a number of times the valid zombie line receives the second access request and any subsequent access request.

In any of the embodiments described herein, the cache controller can be further configured to compare (1) the number from the second hardware counter to (2) the number from the first hardware counter. The cache controller can be further configured to transmit information to the processor indicating that the two numbers are not equal. The processor can be configured to transmit a notification to an operating system indicating the cache line is under attack.

In any of the embodiments described herein, the first hardware counter can be associated with a first core and the second hardware counter can be associated with a second core. The notification can include information identifying the first core.

In any of the embodiments described herein, the first hardware counter can be associated with a first core and the second hardware counter can be associated with a second core. The cache controller can be further configured to isolate the first core in a first memory domain and isolate the second core in a second memory domain. The second memory domain can be separate from the first memory domain.

In any of the embodiments described herein, the first hardware counter can be associated with a first core and the second hardware counter can be associated with a second core. The cache controller can be further configured to isolate the first core in a first time-slice and isolate the second core in a second time-slice. The second time-slice can be different than the first time-slice.

In any of the embodiments described herein, the cache controller can be further configured to compare (1) the number from the second hardware counter to (2) the number from the first hardware counter. The cache controller can be configured to transmit information to the processor indicating when a difference between the two numbers reaches a predetermined threshold. The processor can be configured to transmit a notification to an operating system indicating the cache line is under attack.

In any of the embodiments described herein, the first hardware counter can be associated with a first core and the second hardware counter can be associated with a second core. The notification can include information identifying the first core.

In any of the embodiments described herein, the first hardware counter can be associated with a first core and the second hardware counter can be associated with a second core. The cache controller can be further configured to isolate the first core in a first memory domain and isolate the second core in a second memory domain. The second memory domain can be separate from the first memory domain.

In any of the embodiments described herein, the first hardware counter can be associated with a first core and the second hardware counter can be associated with a second core. The cache controller can be further configured to isolate the first core in a first time-slice and isolate the second core in a second time-slice. The second time-slice can be different than the first time-slice.

These and other aspects of the present invention are described in the Detailed Description of the Invention below and the accompanying figures. Other aspects and features of embodiments of the present invention will become apparent to those of ordinary skill in the art upon reviewing the following description of specific, exemplary embodiments of the present invention in concert with the figures. While features of the present invention may be discussed relative to certain embodiments and figures, all embodiments of the present invention can include one or more of the features discussed herein. Further, while one or more embodiments may be discussed as having certain advantageous features, one or more of such features may also be used with the various embodiments of the invention discussed herein. In similar fashion, while exemplary embodiments may be discussed below as device, system, or method embodiments, it is to be understood that such exemplary embodiments can be implemented in various devices, systems, and methods of the present invention.

BRIEF DESCRIPTION OF THE DRAWINGS

The accompanying drawings, which are incorporated in and constitute a part of this specification, illustrate multiple embodiments of the presently disclosed subject matter and serve to explain the principles of the presently disclosed subject matter. The drawings are not intended to limit the scope of the presently disclosed subject matter in any manner.

FIG. 13a is an example square-and-multiply algorithm used in RSA implementation that can be vulnerable to cache attacks, according to some embodiments.

FIGS. 13b and 13c are timelines of spy-hits on cachelines when the spy attacks using a square-and-multiply algorithm of RSA, according to some embodiments of the present disclosure.

DETAILED DESCRIPTION

Figure 1A:
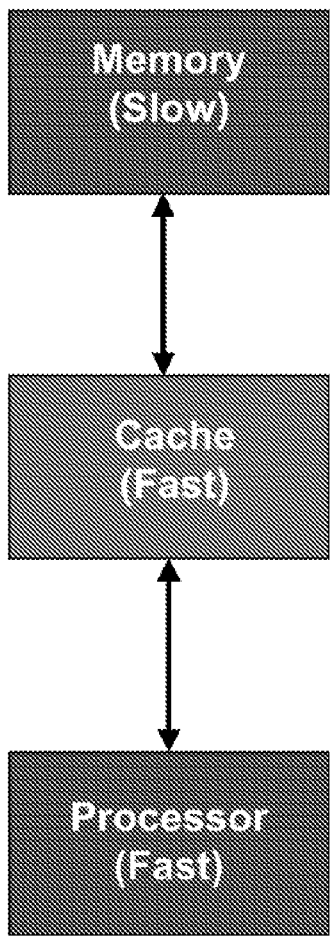
FIG. 1a illustrates an exemplary system for accessing a cache used, according to some embodiments.

Although certain embodiments of the disclosure are explained in detail, it is to be understood that other embodiments are contemplated. Accordingly, it is not intended that the disclosure is limited in its scope to the details of construction and arrangement of components set forth in the following description or illustrated in the drawings. Other embodiments of the disclosure are capable of being practiced or carried out in various ways. Also, in describing the embodiments, specific terminology will be resorted to for the sake of clarity. It is intended that each term contemplates its broadest meaning as understood by those skilled in the art and includes all technical equivalents which operate in a similar manner to accomplish a similar purpose.

Herein, the use of terms such as "having," "has," "including," or "includes" are open-ended and are intended to have the same meaning as terms such as "comprising" or "comprises" and not preclude the presence of other structure, material, or acts. Similarly, though the use of terms such as "can" or "may" are intended to be open-ended and to reflect that structure, material, or acts are not necessary, the failure to use such terms is not intended to reflect that structure, material, or acts are essential. To the extent that structure, material, or acts are presently considered to be essential, they are identified as such.

By "comprising" or "containing" or "including" is meant that at least the named compound, element, particle, or method step is present in the composition or article or method, but does not exclude the presence of other compounds, materials, particles, method steps, even if the other such compounds, material, particles, method steps have the same function as what is named.

It is also to be understood that the mention of one or more method steps does not preclude the presence of additional method steps or intervening method steps between those steps expressly identified.

The components described hereinafter as making up various elements of the disclosure are intended to be illustrative and not restrictive. Many suitable components that would perform the same or similar functions as the components described herein are intended to be embraced within the scope of the disclosure. Such other components not described herein can include, but are not limited to, for example, similar components that are developed after development of the presently disclosed subject matter.

Modern computers use caches to bridge the long latency between the fast processor and slow memory, as shown in FIG. 1a. In some cases, the data requested by the processor can be present in the cache (termed as "cache hit") and can be returned to the processor with low latency. When the requested data is not present in the cache (termed as "cache miss"), the processor can obtain the data from memory and place it in the cache for low-latency retrieval on subsequent accesses to that data item. The granularity at which the data is requested from the memory is called a "line" in memory. Each line in memory is identified with a "Physical Line Address" (PLA). The space in the cache is organized at the granularity of a line as well. The typical size of a line is 64 bytes (although some systems can also use a line size of either 128 bytes or 256 bytes).

Figure 1B:
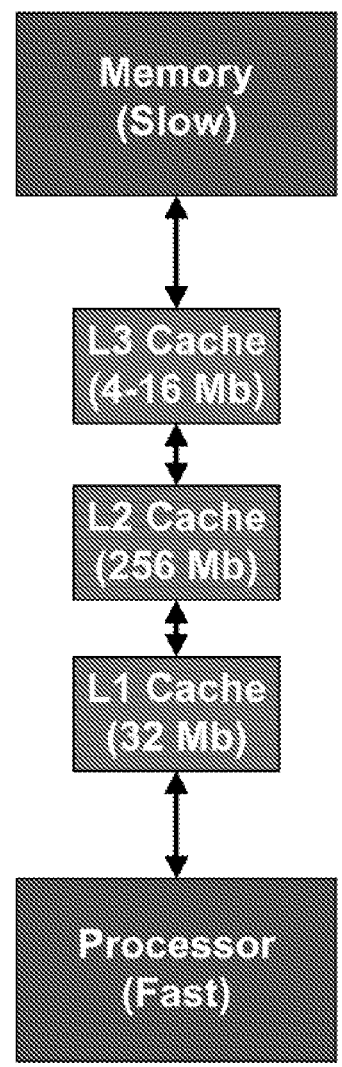
FIG. 1b illustrates an exemplary system for accessing multiple cache levels used, according to some embodiments.

To obtain a higher cache hit-rate, a larger cache can be used. However, a large cache is also slow. To obtain a low latency and also have the capacity of a larger cache, some modern systems can use a multi-level cache hierarchy. FIG. 1b shows an exemplary system with three layers of cache hierarchy. The first level cache is optimized for the lowest latency and has a capacity of 32 kilobytes or 64 kilobytes; whereas the third level cache has capacity of several megabytes and can incur a latency of ten or more cycles, for example.

Figure 1C:
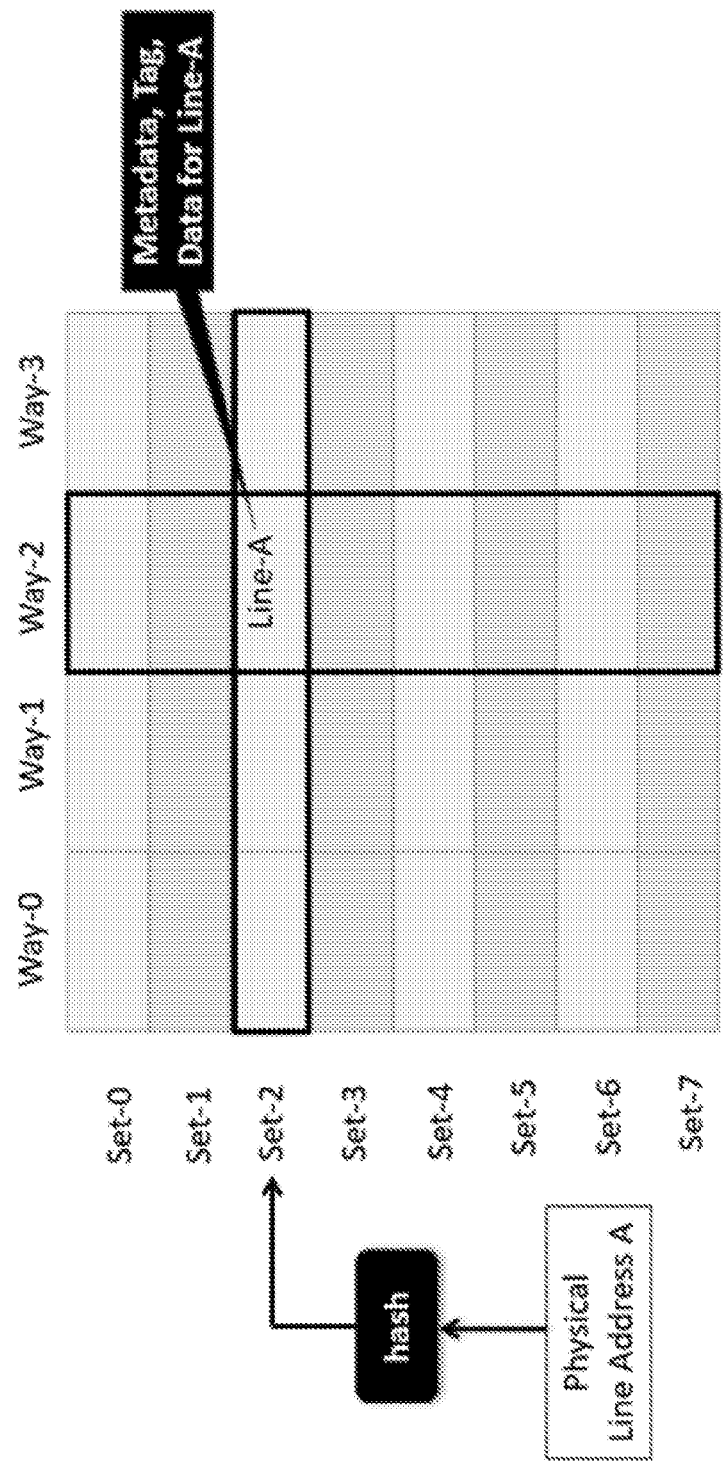
FIG. 1c illustrates an exemplary system for accessing a cache used, according to some embodiments.

An access can result in either a cache hit or a cache miss, depending on whether the line is present in the cache or not. To speed up the process of looking up the cache, the cache can be organized as a two-dimensional array, as shown in FIG. 1c. The rows of a cache are called "sets" and the columns are called "ways." If a third dimension is added to the array, then each plane of sets and ways is called a "bank." A given line (i.e., a line in memory) could be present in any of the ways of a designated set. The designated set for a cache line is determined by passing the line address (for a line in memory) through a hashing function. The commonly used hashing function can simply be using the bottom K bits of a line address, if the cache contains $2^K$ sets. For example, in FIG. 1c, the requested line corresponding to the Physical Line Address "A" gets mapped to "Set-2." The line could be present in any of the ways in Set-2, so all four locations can be checked to determine a cache hit or miss. As shown in FIG. 1c, the line is present in Way-2 of Set-2, and the access would result in a cache hit. Note that each cache location not only stores the data for a line, but also stores a cache "tag" that identifies the Line Address for which the data is stored, and some metadata (such as valid bit, replacement bits, etc.).

Figure 2:
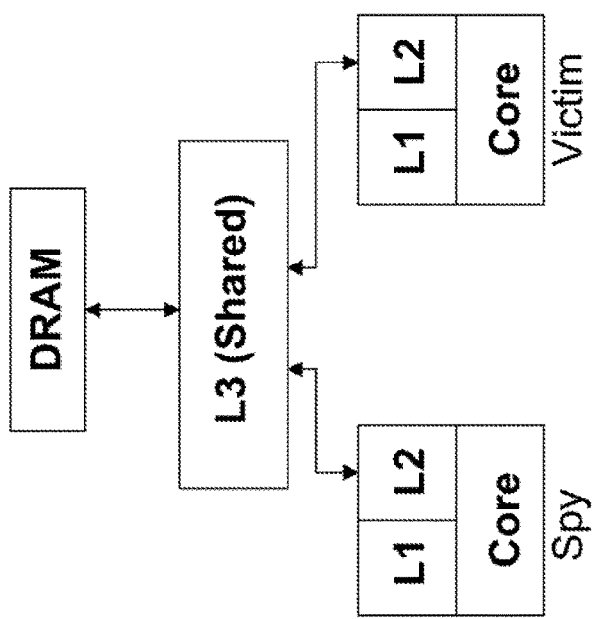
FIG. 2 depicts an exemplary system configuration containing a multi-core processor with private L1 and L2 caches, and a shared L3 cache, according to some embodiments.

Unfortunately, the timing difference between a cache hit and a cache miss can be used as a side-channel by an adversary to infer the access pattern and obtain unauthorized information from the system. Consider for example modern processors that pack multiple cores on a single chip and tend to keep the level-1 (L1) and level-2 (L2) caches private to the core. However, the last-level cache (LLC) is typically shared between all the cores to efficiently utilize the cache space. FIG. 2 depicts an exemplary system configuration containing a multi-core processor with private L1 and L2 caches, and a shared L3 cache. The L3 cache is inclusive and evictions from the L3 cache cause evictions from L1 and L2 (if the line is present). As L3 cache is the point at which resources are shared, the adversary (e.g., "spy") tries to orchestrate evictions in the L3 cache and monitor the hits in the L3 cache to observe the behavior of the victim program.

Although recent proliferation of cache attacks creates a need for efficient mitigation of the attacks, it is also important to preserve the performance optimizations of current system, for example the cache-sharing described above.

OS-based page sharing is one such optimization commonly used in modern systems to avoid redundant copies of pages across applications (such as for library code) or for having multiple copies of the same data pages (by de-duplication of data pages). Such sharing enables different programs accessing the same library code to get routed to the same OS page. While OS-based page sharing is beneficial for memory capacity, such sharing leads to cache side channels between applications, even though the pages are may be shared only in read-only mode. This type of sharing can leave the system susceptible to what is knows an Flush+Reload attacks.

Flush-based attacks can use an instruction called Cache Line Flush (clflush), which explicitly invalidates the cache line from all levels of the processor cache hierarchy, including the instruction and data. The clflush instruction is conventionally provided by the system to support non-coherent input/output (IO) devices, whereby the IO device can write directly to memory and use clflush instructions to ensure that the process can read the up-to-date copy from memory instead of the stale copy from the cache. Flush-based attacks target accesses to the memory locations that are shared between the attacker and the victim. In a Flush+Reload attack, the spy invalidates the shared line using the clflush instruction, waits, and then checks the timing of a later access to that line—if the access incurs shorter latency, then the attacker can infer that the victim application has accessed the given line.

Figure 3:
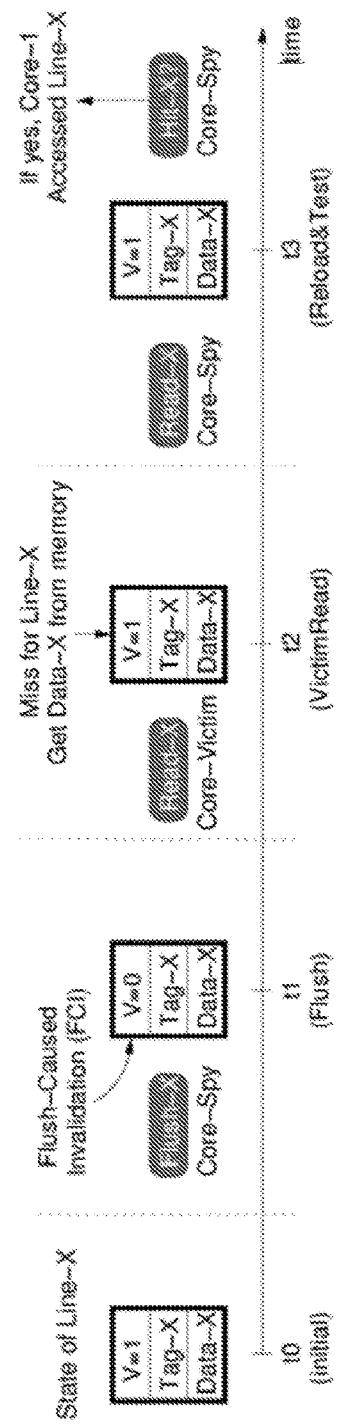
FIG. 3 is a timing diagram of a Flush+Reload attack, according to some embodiments.

FIG. 3 depicts an example Flush+Reload attack, according to some examples. FIG. 3 shows an example of Flush+Reload attack for a given line, Line-X, of shared data. At time t0, the state of Line-X is shown (V denoting the valid bit, the cache tag "Tag-X," and the data "Data-X"). The cache "tag" is described above. Line-X is shared between the spy and the victim. At time t1, a spy program (running on Core-Spy) flushes this line using a clflush instruction. This instruction invokes a Flush-Caused Invalidation (FCI) that invalidates the given line in the cache. The spy program waits for some time. At a later time t2, the victim program (running on Core-Victim) can access the Line-X. This access will miss in the cache, the cache controller will retrieve the data for Line-X (Data-X) from memory and install this data in the cache. At time t3, the Core-Spy accesses Line-X and measures the time for the access to determine if Core-Victim accessed the line during the waiting time. The spy can use the patterns of hits and misses to infer secret information of the victim.

Prior solutions that are highly effective at guarding the cache against conflict-based attacks (e.g., the Prime+Probe attack) become ineffective for Flush-based attacks, as the attacker can precisely invalidate a given line from the cache, without relying on any conflicts. Current methods to mitigate Flush-based cache attacks primarily rely on OS-based or software-based techniques. For example, cache attacks on shared data can be avoided by disabling sharing of critical pages or by dynamically replicating shared pages. Other systems describe rewriting critical applications with transactional memory semantics in order to avoid leakage of timing information to concurrently running applications. These systems and methods, however, are not optimal as they require either removing the optimizations described above such as providing page sharing or rewriting the victim applications entirely.

In contrast, the present disclosure provides systems and methods that protect cache- and main-memory from Flush-based attacks while retaining page sharing, avoiding rewriting the victim applications, and avoiding reliance on profile information. The present systems and methods use the inherent nature of Flush-based attacks to detect the attack and mitigate any potential damage to the memory. For example, when a cache line is invalidated due to Flush-Caused Invalidation (FCI), the tag and data of the invalidated line are still resident in the cache and can be used for detecting the Flush-based attack. Referring again to FIG. 3, for example, at time t1, the FCI resets the valid bit of Line-X while still leaving Tag-X and Data-X in the cache line. Lines that are invalidated due to FCI and still contain meaningful Tag and Data information can be called a zombie line. In some examples, the present disclosure describes using zombie lines to detect Flush-based attacks. This detection can be achieved, in some examples, by one or more of the following steps. First, the tag-entry of the cache line can be modified to include a zombie bit, or a Z-bit, to enable monitoring of the zombie line. Second, the zombie lines can be protected from replacement so as to preserve the line. Conventional replacement algorithms are designed to preferentially pick invalid lines on a cache miss (i.e., the invalid lines are preferentially replaced). To provide protection of zombie lines, the cache replacement policy can be modified to treat an invalid zombie line similar to a valid line, and evict the line only when the line would have been naturally evicted from the cache, as if it had not received an FCI. Third, tag hits on an invalid zombie line can be used to identify the cache line as recently invalidated by the FCI. In some embodiments, a replacement algorithm can be modified to use the invalid zombie line as a victim, i.e., the zombie bit can be marked valid if the data obtained from memory was identical to the data resident in the line, as this can indicate that the flush was completed unnecessarily. Finally, mitigation steps can be taken for the line that receives a hit (or access request) at the valid zombie line.

The present disclosure describes systems and methods to tolerate cross-core Flush+Reload attacks by presenting hardware-based solutions that include the steps described above. The present systems and methods are beneficial in that they require only 1-bit per cache line. They also do not cause slowdown for benign applications, as those applications tend to not have the pattern of flush followed by reload of identical content. Embodiments of systems and methods will now be referred to with respect to the accompanying figures.

Figure 4:
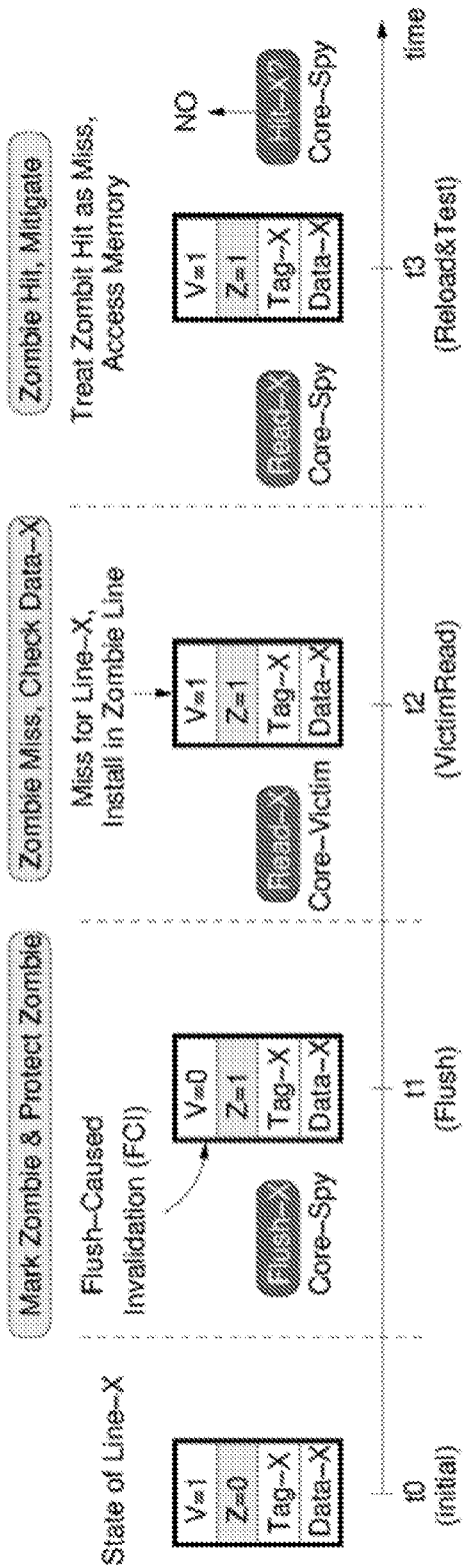
FIG. 4 is timing diagram of an example process for identifying an attack on a cache line, according to some embodiments of the present disclosure.

FIG. 4 is timing diagram of an example process for identifying an attack on a cache line, according to some embodiments of the present disclosure. FIG. 4 is similar to FIG. 3, except that Line-X in FIG. 4 contains a zombie bit (i.e., Z-bit). In some embodiments, to track a zombie status of a line, a Z-bit can be added to the tag store entry of the cache line. When a line is installed in the cache, and it is not already present in a zombie state, the Z-bit can be set to 0. In other words, the Z-bit is set to 0 by default. In some examples, the Z-bit can be set to 1 if the line is invalidated due to an FCI. At time t0, the line can be resident in the cache with tag as Tag-X and data as Data-X. The valid bit (V) is 1 at the initial state (or the valid bit is "1" by default), and the line is not a zombie, as indicated by Z=0.

In some embodiments, the first step for identifying the attack can include marking the zombie line, as shown at t1. At time t1, the line receives a Flush-Caused Invalidation (FCI) from the spy application on Core-O. In some embodiments, given the resident valid line was invalidated due to an FCI, the valid bit can be reset (V=0), and the line can be marked as a zombie line (Z=1). The line can continue to have Tag-X and Data-X. In some embodiments, a cache line hierarchy can be equipped with signals to identify if the invalidation is caused due to clflush or some other reason, as will be understood by one of skill in the art.

In some embodiments, the second step for identifying the attack can include protecting the zombie line until natural eviction. A line marked as a zombie but in an invalid state (for example the cache line in FIG. 4 at time t1) can be dislodged by the cache replacement algorithm if there is another miss to the set. In some example systems, it can be preferred that the zombie lines reside in the cache for a time period similar to that if the line was not invalidated due to FCI. Protection for the zombie line can be provided by modifying the replacement algorithm to not pick an invalid zombie line as the replacement victim, unless it would be picked anyway given the recency/reuse status as dictated by the replacement algorithm. For example, for Least Recently Used (LRU) replacement policies, the invalid zombie line is not victimized unless it becomes the LRU line. All through the residency of the invalid-zombie line in the cache, the line can continue to participate in the replacement status updates as if the line was not invalidated by FCI. In other words, for LRU replacement, the line would traverse all the way from Most Recently Used (MRU) to LRU, and only then get evicted. In some embodiments, such protection for zombie lines can ensure that the time a line spends in the cache remains unaffected by FCI. Given that flush operations are typically performed only on a few (tens) of lines and the L3 cache has tens of thousands of lines, protection of invalid zombie lines may not affect overall system performance.

In some embodiments, the third step for identifying the attack can include acting on a zombie-miss, as shown at t2. In a conventional cache design, only the valid lines are tested for a tag match. In the present systems and methods, the tag-match logic can be extended to also detect cases where there is an invalid-zombie line with a tag identical to what is being accessed. These cases can be defined as a zombie-miss. Similar to normal misses, data is retrieved from memory on a zombie-miss. However, the incoming cache line can be deterministically placed in the cache way such that when a zombie-miss is encountered, the valid bit is set. An example of this is shown by marking valid bit (V) as valid (V=1) at time t2. If the data retrieved from memory was different than what is stored in the cache, it means this was a legitimate use of clflush. For example, an asynchronous IO modified the memory content between the flush and the access. In this case, the zombie status of the line can be reset as invalid (Z=0). However, if the data retrieved from memory is identical to the data already stored in the line, then the zombie status can be maintained (Z=1) as the invalidation was unnecessary and the line can be a candidate for an attack. Time t2 in FIG. 4 shows a zombie line that is maintained (Z=1) and the valid bit is marked valid (V=1), thereby creating a valid zombie line.

In some embodiments, the fourth step for identifying the attack can include acting on a zombie-hit, as shown at time t3. On a cache hit to the line, the tag match logic can also check the Z-bit of the line. A cache hit to a valid zombie line can be called a zombie-hit. An attacker could potentially use the hits to valid zombie lines to leak an access pattern of the victim. In some embodiments, the present systems and methods include invoking mitigation policies that can close the timing leak from access to zombie lines, as will be described herein. Table 1 describes the cache operations described for the timing diagram of in FIG. 4.

TABLE 1

| Zombie Bit | Valid Bit | Tag Match? | Meaning and/or Action |
|---|---|---|---|
| X | X | No | Normal Miss |
| 0 | 0 | Yes | Normal Miss |

TABLE 1-continued

| Zombie Bit | Valid Bit | Tag Match? | Meaning and/or Action |
|---|---|---|---|
| 0 | 1 | Yes | Normal Hit |
| 1 | 0 | Yes | Zombie-Miss (Step-3 at t2) |
| 1 | 1 | Yes | Zombie-Hit (Step-4 at t3) |

In some embodiments, the episodes of zombie-hits and zombie-misses can be tracked by the hardware to detect and mitigate the attack. For example, dedicated hardware counters can be incremented on zombie-hits and zombie-misses, and the hardware can then inform the operating system (OS) running on the system of a possible attack if these counters exceed a certain threshold. Hybrid software/hardware mitigation systems and methods are described in greater detail herein. In some embodiments, however, the present systems and methods can tolerate attacks transparently in hardware without requiring OS support. Zombie-hits and zombie-misses are vital for a successful Flush+Reload attack—if the victim never accesses the line in validated by the flush, then the spy cannot obtain any information about the victim access pattern. Similarly, for the attack to be successful, there must be a timing difference (hit/miss) for accessing the line after the flush, depending on whether the victim accessed the line, otherwise the spy cannot learn any information about the victim access pattern. These conventions for a Flush+Reload can be exploited to provide a hardware-based system to mitigate the attacks. One example of these hardware-based mitigation systems includes providing a longer latency for all zombie-hits. For example, in the reload phase of a Flush+Reload attack, when the spy accesses the line, the line can incur high latency regardless of whether the line was absent from the cache (cache miss) or if the victim brought the line in the cache (zombie-hit). On a zombie-hit to a line, the hardware-based system can trigger an extraneous memory access for the same line and return the cached data to the processor only after this extraneous request from memory is returned (the data obtained from the memory can be ignored and not installed in the cache). Throughout this disclosure, such hardware-based mitigation systems can be referred to as Zombie-Based Mitigation (ZBM).

Figure 5:
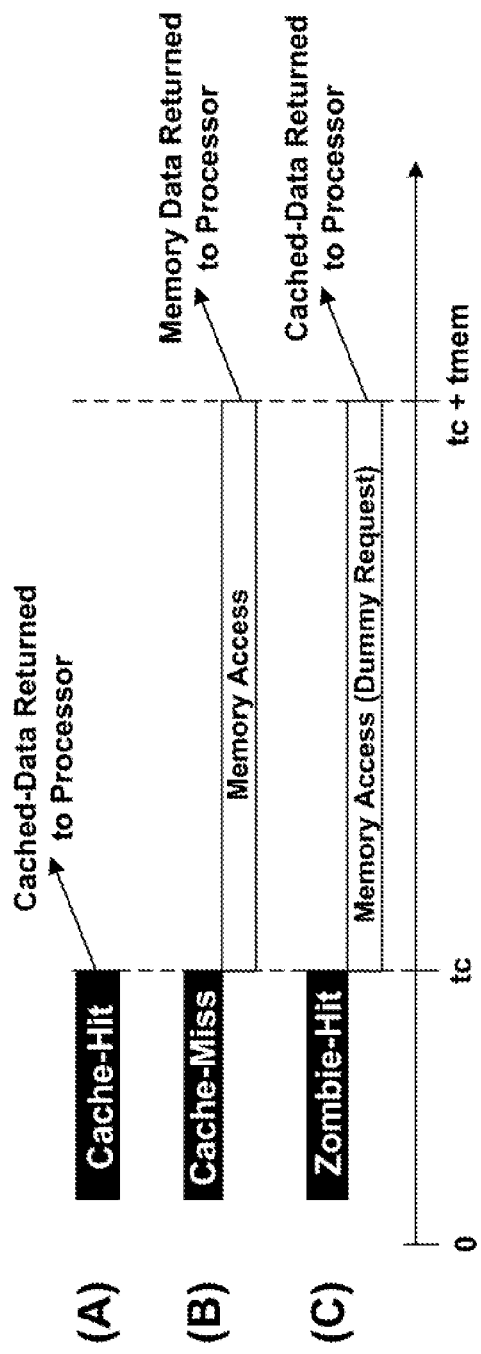
FIG. 5 is a timeline of an example hardware-based mitigation (ZBM) system, according to some embodiments of the present disclosure.

FIG. 5 is a timeline of an example hardware-based mitigation (ZBM) system, according to some embodiments of the present disclosure. A cache hit (to a non-zombie line) can be served with cache hit latency (tc), as shown in line (A). A cache miss can be served with an additional memory latency (tmem), as shown in line (B). On a zombie-hit, the cache can wait for a time period of tmem, for example by triggering and waiting for the extraneous request. This extra latency, or what can be called a latency period, provided by the system can enable the cache to incur the same latency as a cache miss. The episode of flushing a line, retrieving it with unchanged content from memory, and doing so repeatedly does not ordinarily occur in typical applications. Accordingly, benign applications can avoid slowdowns even if there is a higher latency for zombie-hits.

In some embodiments, and as described above, the mitigation protocols for Flush-based attacks can also include software-based systems and methods. Some exemplary software-based, or OS-based, systems can take advantage of the inherent nature of attacks. As described above, a successful cross-core attack using the Flush+Reload attack, for example, ordinarily requires two things: (1) there should be a flush of a shared line, and (2) such flush-invalidations should be followed by at least one access to the line which brings the flushed line in the cache. It is also important that the above actions of flush and reload happen from different cores at least some of the time. This behavior can enable an OS-based mitigation system to identify the pair of applications that could be victim and spy in a cross-core attack.

Figure 6:
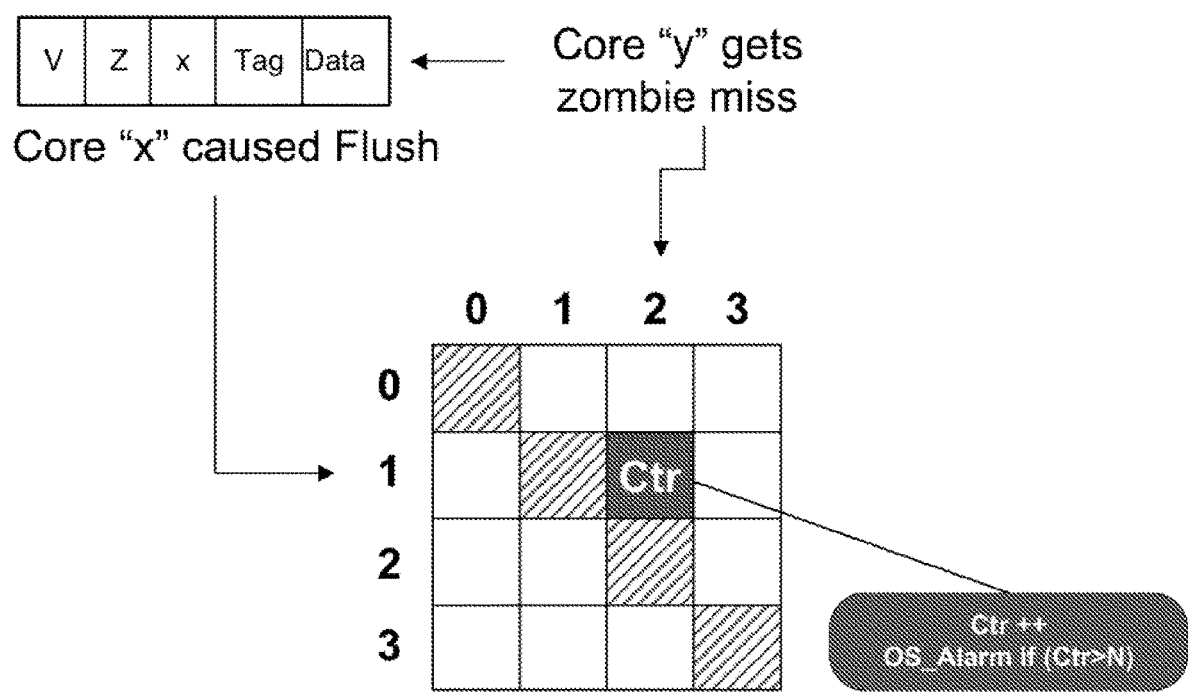
FIG. 6 depicts a hardware-software hybrid system for identifying and mitigating a Flush-based attack, according to some embodiments of the present disclosure.

FIG. 6 depicts a hardware-software hybrid system for identifying and mitigating a Flush-based attack, according to some embodiments of the present disclosure. As described above, some hardware-based systems can include hardware counters that can be incremented on zombie-hits and zombie-misses, and the hardware can then inform the operating system (OS) running on the system of a possible attack if these counters exceed a certain threshold. These counters can be used to create a two-dimensional table, or an attack-detection table (ADT), to categorize and track the hits and misses. The ADT counters can be indexed on the x-axis by the core that caused the flush (i.e., Flushing-CoreID) and on the y-axis by the core that incurred a miss on the invalid-zombie line (i.e., Zmiss-CoreID). In some embodiments, each cache line in the cache can also store the ID of the Flushing-CoreID. On a zombie-miss, the ID of the core that encountered the miss and the Flushing-CoreID stored in the zombie-line can be used to increment the corresponding ADT. The diagonals of the ADT indicate flush and reload by the same core. For the cross-core attacks, the non-diagonal entries are expected to increment over time. When the non-diagonal entries reach a threshold, the ADT can interrupt the OS and inform it of a possible Flush+Reload attack. This can be achieved, for example, by sending a notification to the OS indicating the cache line is under attack. In some embodiments, the ADT can also provide the index of the ADT entry that caused the overflow, for example within the notification. The threshold for the non-diagonal entries can be set, for example, to interrupt the OS if the non-diagonal entries reach a maximum value for the counter. The threshold for the non-diagonal entries can also be set to a difference between the value on the "x" axis and the value on the "y" axis. Using FIG. 6 to illustrate, the threshold for the system could be set to interrupt the OS if the difference between the "x" axis (Flushing-CoreID) and the "y" axis (Zmiss-CoreID) is equal to or greater than 1. In FIG. 6, since the difference in the ADT is 1, the system can send a notification to the OS. It is also contemplated that the threshold difference could be higher than 1 so as to provide some tolerance in the system.

Figure 7:
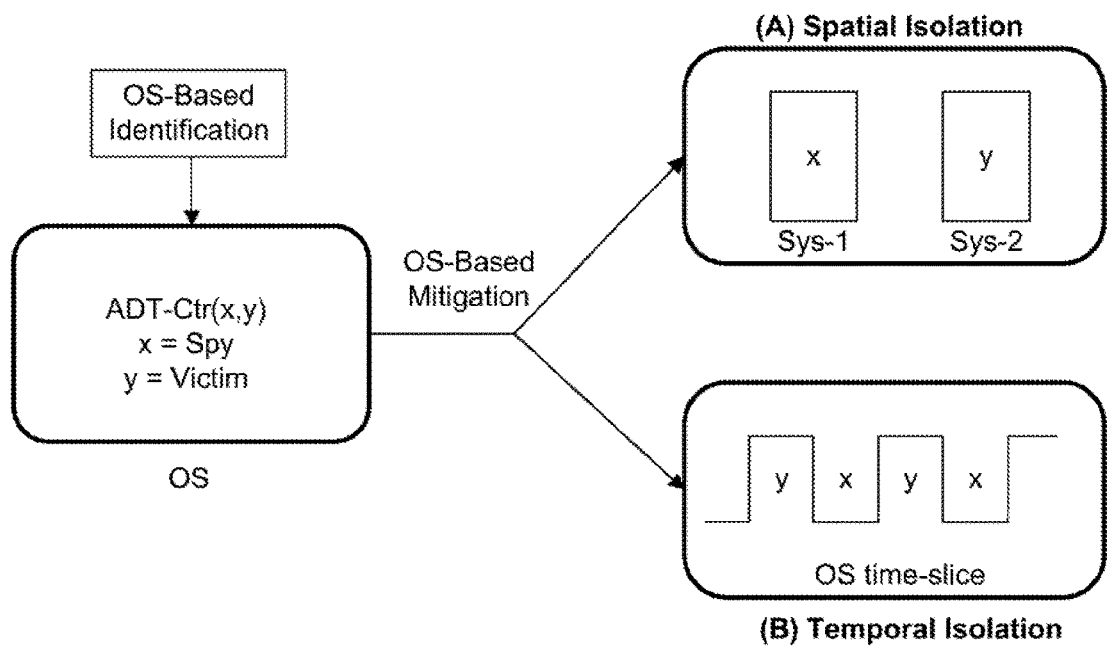
FIG. 7 is a diagram showing an exemplary method for isolating a victim and a spy in spatial isolation (A) and temporal isolation (B), according to some embodiments of the present disclosure.
Figure 8:
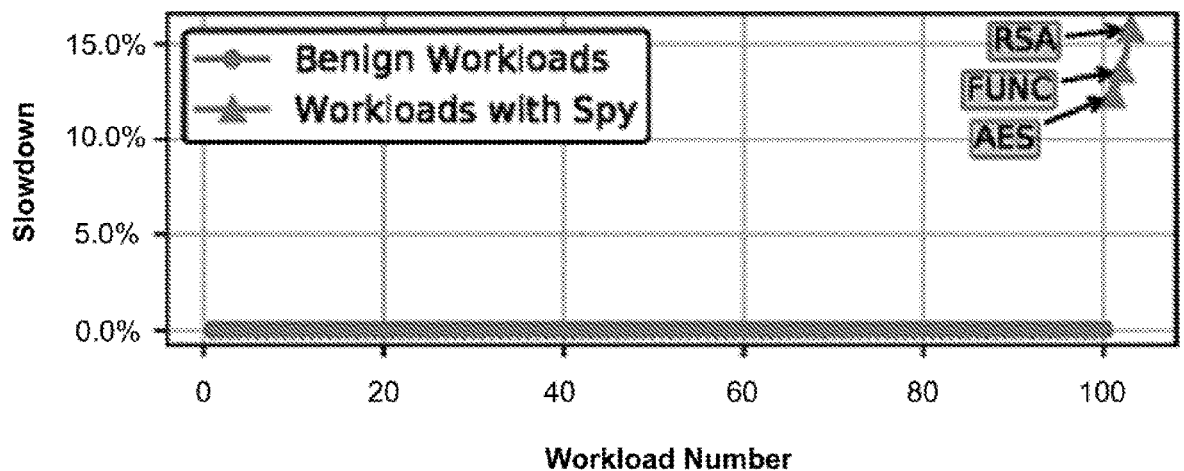
FIG. 8 is a graph showing the slowdown of aggregate system performance using temporal isolation, according to some embodiments of the present disclosure.

In some embodiments, OS-based mitigation systems and methods can not only identify the flush and the core that caused the flush, but the presently-described OS-based systems and methods can also mitigate the risk of attack by isolating the spy core. These mitigation protocols can take advantage of the ADT described above in reference to FIG. 6. For the cross-core attack to be successful, the victim and the spy processes should be located in the same coherence domain (spatial sharing) and they should be scheduled concurrently (temporal sharing). If an OS-based mitigation policy triggers an alarm, for example when the non-diagonals of the ADT overflow, the coordinate of the ADT (x,y) can help to identify the spy and the victim: "x" caused the flush of the lines and is the spy; "y" is the victim. Once the victim and spy processes are identified, then the OS-based solution can provide either spatial isolation or temporal isolation between the victim and spy. FIG. 7 is a diagram showing an exemplary method for isolating the victim and spy in both spatial isolation (A) and temporal isolation (B), according to some embodiments of the present disclosure. As shown in block (A), in a system with a large number of independent machines, for example a cloud-computing system, a scheduler can place the spy and the victim on different machines and/or memory domains. This would be the spatial isolation approach for separating the spy and the victim. As shown in block (B), systems with only one machine can alternatively use temporal isolation to separate the spy and the victim. This can be achieved by separating the spy and the victim into different time-slices, e.g., the "x" or spy core is in a first time-slice, and the "y" or victim core is in a second time-slice. In some embodiments, this could reduce the throughput of the victim and the spy, but such slowdown would only occur when an attack is detected. Normal applications (without Flush+Reload) should not trigger the alarm and should not cause a slowdown. FIG. 8 is a graph showing the slowdown of aggregate system performance using temporal isolation for 103 workloads (100 benign+3 attacks). As can be seen, there is no slowdown for the 100 benign workloads and loss of only 12-15% system performance for the three workloads under attack with a spy.

As used in this application, the terms "component," "module," "system," "server," "processor," "memory," and the like are intended to include one or more computer-related units, such as but not limited to hardware, firmware, a combination of hardware and software, software, or software in execution. For example, a component may be, but is not limited to being, a process running on a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Figure 9:
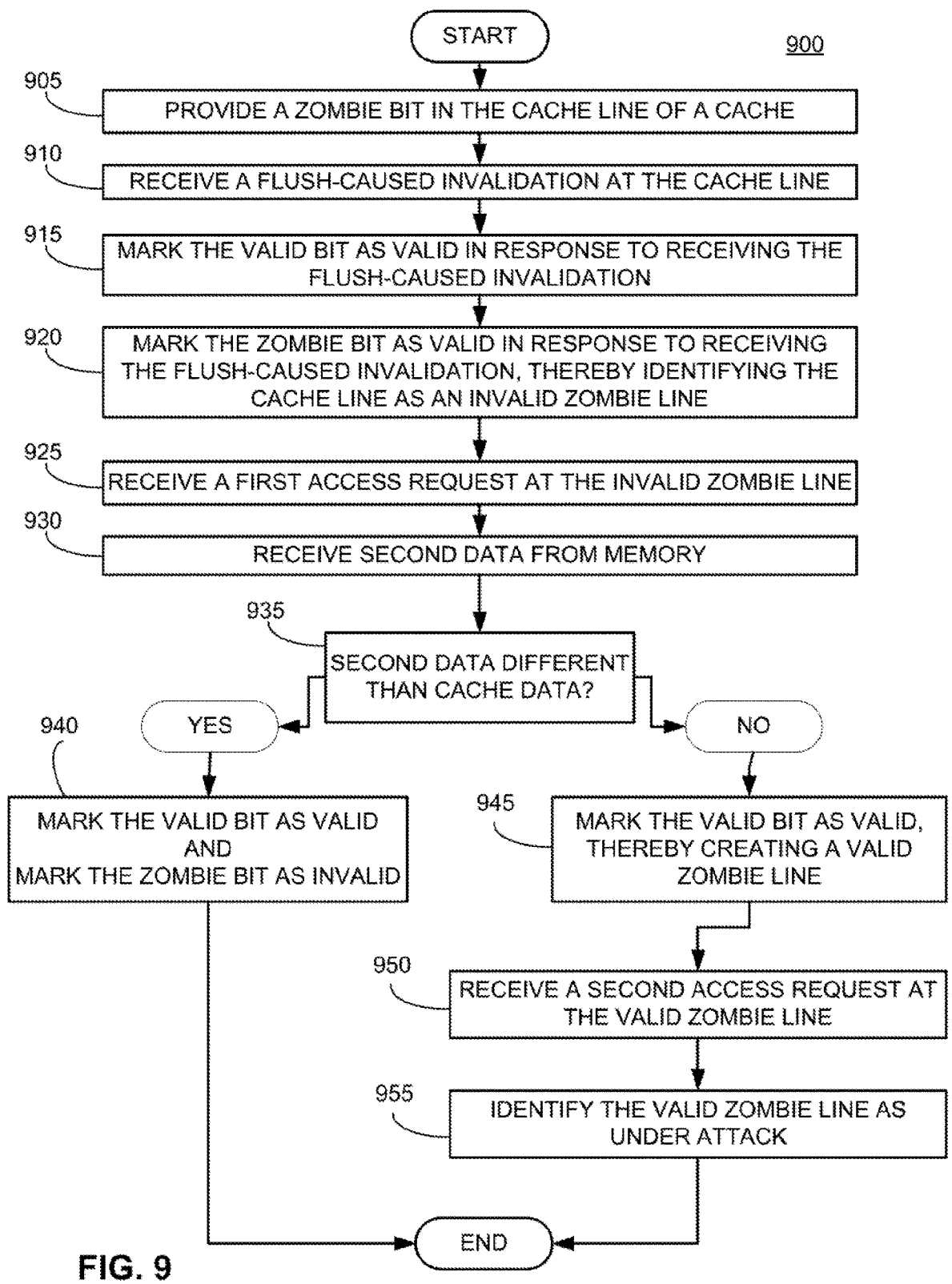
FIG. 9 is a flowchart illustrating an exemplary method of identifying a side-channel attack on a cache line, according to some embodiments of the present disclosure.
Figure 10:
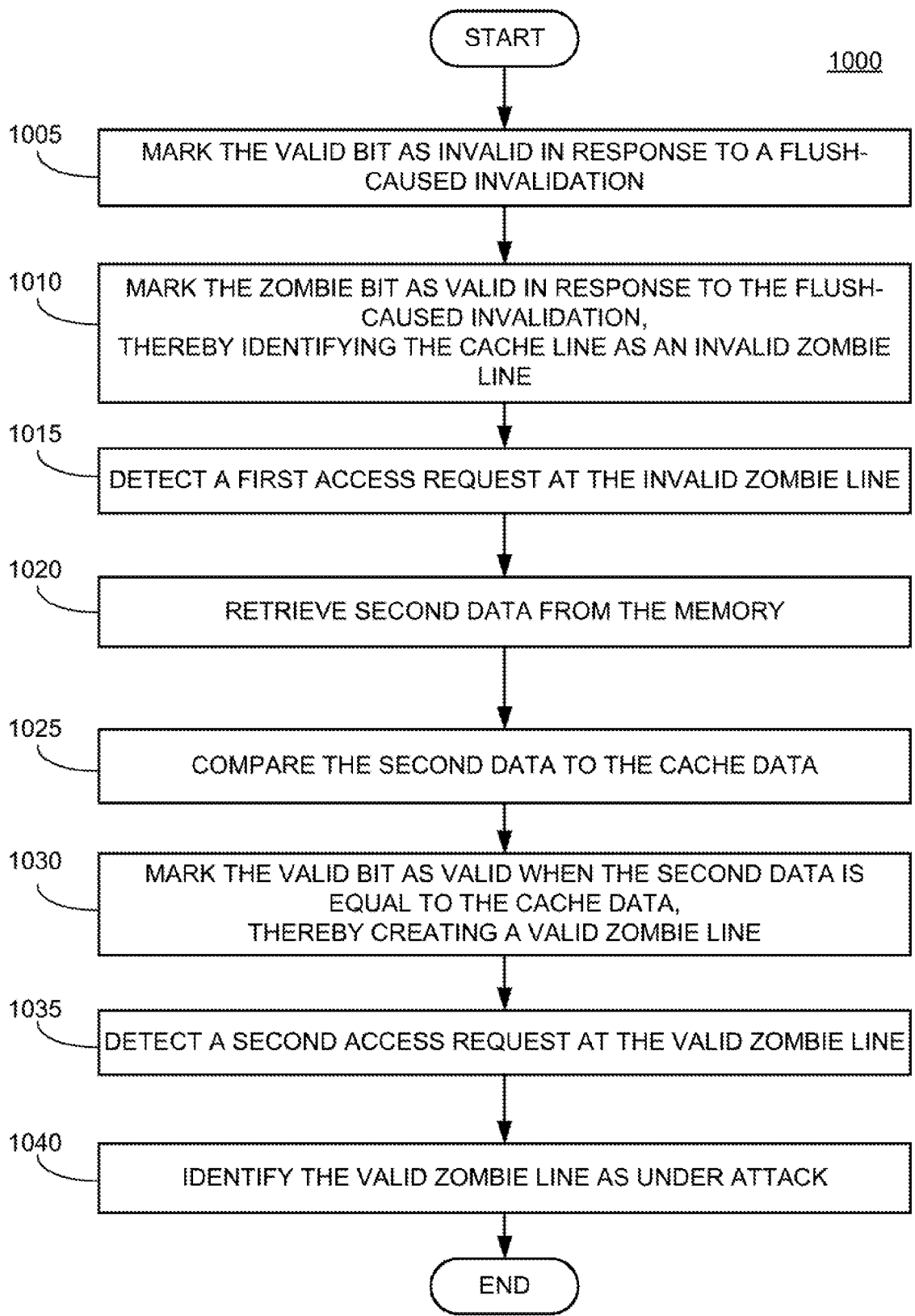
FIG. 10 is a flowchart illustrating an exemplary process for identifying a side-channel attack on a cache line, according to some embodiments of the present disclosure.

FIGS. 9 and 10 are flowcharts depicting exemplary methods and processes for identifying side-channel attacks on cache lines, according to some embodiments of the present disclosure. In some cases, the methods and processes may be implemented, for example, using some or all of the components of computing device architecture 1600 shown in FIG. 16. However, this is merely an example and, in some cases, the methods and processes may be implemented by any other components, including any of the components described herein or otherwise appreciated.

FIG. 9 is a flowchart illustrating an exemplary method 900 of identifying a side-channel attack on a cache line, according to some embodiments of the present disclosure. Method 900 can begin at block 905, where a zombie bit can be provided in the cache line of a cache. The cache line can also include a cache tag, cache data, and a valid bit. In an initial state, or by default, the valid bit can be marked valid (indicating the cache line has not been invalidated, i.e., V=1) and the zombie bit can be marked invalid (or Z=0).

At block 910, method 900 includes receiving a flush-caused invalidation at the cache line. In response to this flush-caused invalidation, method 900 can proceed with two additional steps. At block 915, the valid bit can be marked as invalid in response to receiving the flush-caused invalidation. At block 920, the zombie bit can be marked as valid in response to receiving the flush-caused invalidation. At this step, since the valid bit is marked invalid (or V=0) and the zombie bit is marked valid (or Z=1), the cache line can now be identified as an "invalid zombie line."

At block 925, method 900 includes receiving a first access request at the invalid zombie line. This access request could be, for example, from the victim core (or the "y" core) described above. At block 930, method 900 includes receiving second data from memory. At block 935, method 900 can proceed in separate routes. To do so, at block 935 it can be determined whether the second data is the same as the cache data present at the initial state.

At block 940, the second data is different than the cache data. Method 900 can, therefore, include marking the valid bit as valid and marking the zombie bit as invalid. In other words, the valid bit and the zombie bit can be returned to their initial, default state (V=1; Z=0). This scenario can indicate that the flush of the cache line is a legitimate use of the flush instruction. For example, if the received second data is different than the cache data, it can indicate that an asynchronous IO device modified the memory content. Method 900 can, therefore, end after block 940, and the valid bit and zombie bit are reset so method 900 can begin again at block 905.

Alternatively, at block 945, the second data is equal to the cache data. In this scenario, the valid bit can be marked as valid (V=1) and the zombie bit can remain valid (Z=1). This can create a "valid zombie line." This valid zombie line can be a candidate for an attack.

At block 950, method 900 includes receiving a second access request at the valid zombie line. Throughout this disclosure, such an access request can be defined as a "zombie hit." At block 955, method 900 includes identifying the valid zombie line as under attack. Method 900 can end after block 955.

In some examples, the hardware- and/or software-based mitigation protocols can be performed after block 955. For example, hardware counters could be provided to track the number of times the cache line receives the flush-caused invalidation and/or the number of times the valid zombie lines receives the second access request. An attack-detection table (ADT), as described above, can be used to compare the numbers from the trackers, and a notification can be transmitted to an operating system indicating the cache line is under attack. In some examples, the counters can be used to identify the core that caused the flush-caused invalidation and the core that performed the second access request, thereby enabling the cores to be isolated spatially (e.g., in different memory domains) or temporally (e.g., in different time-slices), for example. In other examples, method 900 can proceed to other method steps not pictured.

FIG. 10 is a flowchart illustrating an exemplary process 1000 for identifying a side-channel attack on a cache line, according to some embodiments of the present disclosure. The process 1000 can be performed, for example, by a system comprising a memory, a shared cache level, and a cache controller. The shared cache level includes a cache line. The cache line includes a zombie bit marked invalid (Z=0) by default, a cache tag, cache data, and a valid bit marked valid by default (V=1). The steps (or blocks below) of identifying the side-channel attack in process 1000 can be performed by the cache controller of the system. As will be appreciated, the cache controller can be system hardware that checks for hits/misses on the cache line independent of software that may be implemented on the system. Process 1000 can also be performed by a processor, microprocessor, or similar components, such as the various components described herein, including the components of the computing device architecture 1600 shown in FIG. 16.

The process 1000 can begin at block 1005, which includes marking the valid bit as invalid (V=0) in response to a flush-caused invalidation. At block 1010, process 1000 includes marking the zombie bit as valid (Z=1) in response to the flush-caused invalidation. At this step, the cache line can be identified as an "invalid zombie line."

At block 1015, process 1000 includes detecting a first access request at the invalid zombie line. This access request could be, for example, from the victim core (or the "y" core) described above. At block 1020, process 1000 includes retrieving second data from the memory. This retrieval, again, can be performed by the cache controller of the system.

At block 1025, process 1000 includes comparing the second data to the cache data. As described herein, this comparison can be used to determine if the flush instruction was benign (e.g., caused properly by an asynchronous IO device) or is a potential attack from a spy core. At block 1030, process 1000 includes marking the valid bit as valid (V=1) when the second data is equal to the cache data. This creates a "valid zombie line" in the cache line (i.e., V=1, Z=1).

At block 1035, process 100 includes detecting a second access request at the valid zombie line. This can be refereed to as a "zombie-hit." At block 1040, process 1000 includes identifying the valid zombie line as under attack. Process 1000 can end after block 1040 or proceed on to other steps not pictured. For example, the hardware- or software-based mitigation protocols described herein can be performed.

Certain embodiments and implementations of the disclosed technology are described above with reference to block and flow diagrams of systems and methods according to example embodiments or implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, may be repeated, or may not necessarily need to be performed at all, according to some embodiments or implementations of the disclosed technology.

ANALYSIS AND EXAMPLES

The following exemplary use cases describe examples of a typical user flow pattern. They are intended solely for explanatory purposes and not limitation.

The hardware-based (e.g., ZBM) mitigation examples described herein can be validated by their ability to defend against attacks. The following analysis depicts the results of exemplary ZBM systems and methods at defending against three representative attacks: (1) attacking the Advanced Encryption Standard (AES) T-tables, (2) snooping the execution path of a secret-dependent function execution at the victim, and (3) attacking the Square-And-Multiply algorithm of Rivest-Shamir-Adleman (RSA). The system used in the following analyses implements a system with 8-cores sharing a 16 MB L3 cache. Table 2 shows the configuration of the systems used in the analyses.

TABLE 2

| | Processor |
|---|---|
| Core parameters | 8-cores, 3.2 GHz |
| L1 and L2 cache | 32 KB, 256 KB 8-way (private) |
| | Last Level Cache |
| L3 (shared) | 8 MB, 16-way, LRU, 24 cycles |
| | DRAM Memory-System |
| Bus frequency | 1200 MHz (DDR 2.4 GHz) |
| Channels | 2 (8-Banks each) |
| tCAS-tRCD-tRP | 14-14-14 nanoseconds |

Figures 11A, 11B:
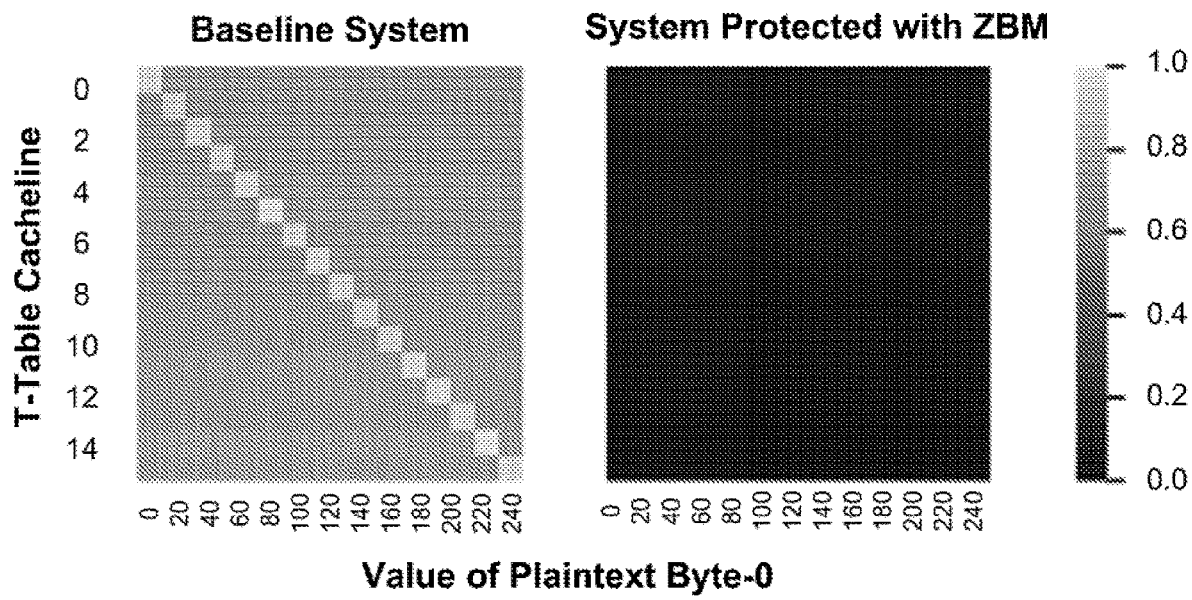
FIGS. 11a and 11b are heatmaps showing the number of hits observed at cachelines when a spy attacks AES T-tables, according to some embodiments of the present disclosure.

The first attack analyzed was attacking the AES T-tables. Commonly used crypto libraries like OpenSSL and GnuPG use an AES implementation with T-tables, which have been shown to be vulnerable to cache-attacks that leak the secret key. In such an implementation, in each of the 10 AES rounds, a total of 16 accesses are made to four T-tables which are spread over 16 cachelines. The table indices accessed in each round are calculated as a function of the input plaintext p and a secret key k, with the first-round indices being ($x_i = p_i \oplus k_i$), where i is the byte-number in the block. To test the systems, a chosen-plaintext attack was chosen. The spy supplied a series of plaintext blocks to be encrypted by the victim, keeping a byte $p_0$ constant and randomly varying the other $p_i$ for $i \neq 0$ in each block. This can ensure that a fixed index $x_0$ always receives a hit in the first round, and as a result can have a higher number of hits on average compared to other entries in the T-table. By identifying which T-table cacheline receives maximum hits using a Flush+Reload attack over a large number of encryptions, the spy can decipher the top 4-bits of the index $x_0$ (that determines the cacheline number) and consequently the top 4-bits of $k_0$ (as $p_0$ is also known to the spy). By sequentially changing which plaintext byte is constant, a spy can recover 64 out of 128-bits of the secret key. FIGS. 11a and 11b are heatmaps showing the number of hits observed by the spy across the cachelines of the T-tables as the plaintext-byte changes, with 10K blocks encrypted per chosen plaintext-byte. FIG. 11a is a graph for a baseline system without the hardware-based detection described herein, and FIG. 11b is a graph using the zombie-based hardware detection (e.g., ZBM). Both graphs are normalized to the maximum hits for any cacheline across both configurations. In the baseline (FIG. 11a), as $p_0$ (and $x_0 = p_0 \oplus 0$) increases from 0 to 255, the cacheline corresponding to $x_0$, the table index receiving the maximum hits discernibly changes from 0 to 15, with each cacheline storing 16 entries. Compared to the average of 1368 hits/cacheline, the maximum observed is 1892 hits/cacheline. With the ZBM in place (FIG. 11b), the spy does not see any pattern, because the system utilized can provide data with latency of memory access on both zombie-hits and zombie-misses.

Figures 12A, 12B:
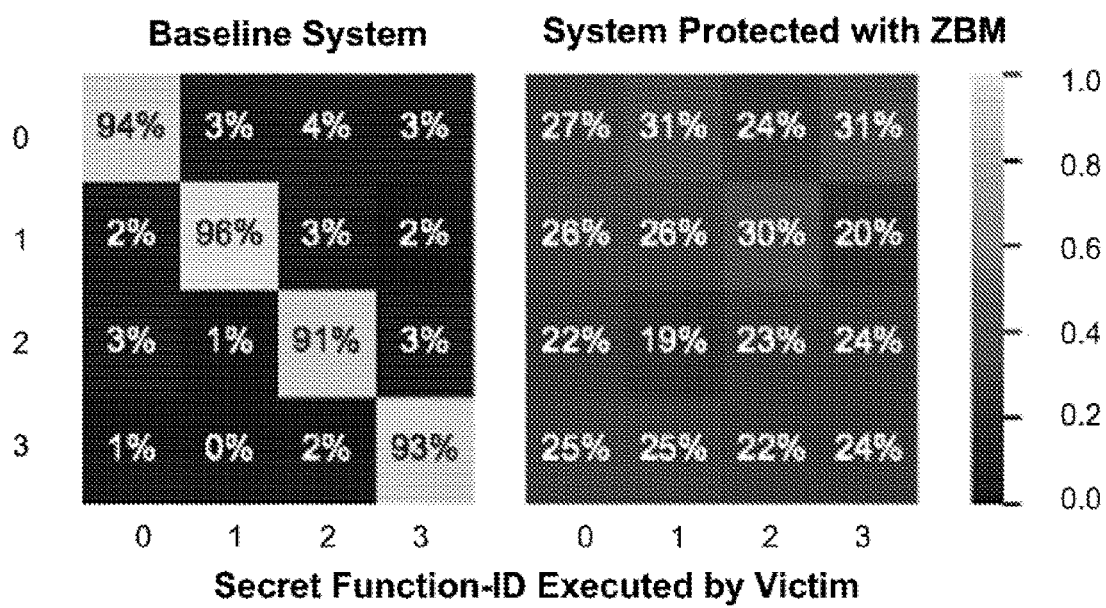
FIGS. 12a and 12b are heatmaps showing the percentage of attempts where a spy correctly or incorrectly infers the function executed by the victim when the spy attacks using a Function Watcher attack, according to some embodiments of the present disclosure.

The second attack analyzed was snooping the execution path of a secret-dependent function execution at the victim, otherwise known as Function Watcher attack. Just as a spy can snoop the data-access pattern of the victim, the spy can also snoop the code-access pattern of the victim. Such attacks that snoop the functions of the victim have been demonstrated on PDF processing applications, for example. The following analysis is a model of such a Function Watcher attack. In this attack, a victim that picks and executes a call to one out of 4 functions based on a secret value is modeled. Each function executes 5000 instructions. The spy executes a cross-core Flush+Reload attack on the addresses corresponding to the entry-points of each of these functions. On a subsequent reload following the flush, by observing which function address receives a cache-hit (lowest latency), the spy infers the function being executed by the victim. FIGS. 12a and 12b are heatmaps showing the percentage of attempts where the spy correctly (diagonal entries) or incorrectly (non-diagonal entries) infers the function executed by the victim, over 10K function calls. FIG. 12a is a graph for a baseline system without the hardware-based detection described herein, and FIG. 12b is a graph using the zombie-based hardware detection (e.g., ZBM). In the baseline (FIG. 12a), the spy correctly infers the victim's function-ID and the corresponding secret in a majority of the attempts (91% to 96%). With the ZBM (FIG. 12b), the attacker successfully infers the correct function-ID in only 23%-27% of the attempts, irrespective of the function executed by the victim. Moreover, all the other three incorrect function-IDs are equally likely (19%-31% each). Thus, the attack on the system with ZBM is no-better than a random guess. This is because ZBM ensures that on a spy-reload, both zombie-hits (function entry-point accessed by victim) and zombie-misses (un-accessed addresses) have similar high latency, thereby leaking no information to the spy.

The third attack analyzed was attacking the Square-And-Multiply algorithm of RSA. As will be appreciated, a square-and-multiply algorithm used in RSA implementation can be vulnerable to cache attacks. FIG. 13a is an example code for such vulnerable square-and-multiply algorithm. The algorithm computes "b exponentiated to e, followed by mod m." The algorithm iterates from the most-significant bit of the key to the least-significant-bit, always performing a square operation (top arrow) and performing the multiply operation (bottom arrow) only if the bit is a "1." By observing the access pattern for lines that execute the square function and the multiply function, the spy can infer the secret information (e) of the victim program—SQR followed by SQR is a 0 whereas SQR followed by a MUL is a 1. The lines containing the instructions for the SQR function and the MUL function are termed probe addresses. The spy can infer the access pattern of the victim by causing an eviction of the probe address, waiting, and then testing if the probe address was accessed by the victim (by checking if a hit is obtained for the probe address). Depending on how the evictions are performed, cache attacks can be classified as either (a) conflict-based attacks or (b) flush-based attacks. In the present analysis, a predefined key of 3072 bits was used, where every 8th bit is a 1 (e.g. key is 0000000100000001 . . . ). For a Flush+Reload attack on the baseline system, it is expected that the spy encounters 8 hits to SQR followed by one hit to MUL.

FIG. 13b shows the results of the RSA attack for a baseline system without ZBM. FIG. 13b shows the time at which hits for SQR and MUL are encountered for a period between 10,000 cycles to 90,000 cycles. A hit to SQR followed by a hit to MUL indicates a "1" in the key, whereas a hit to SQR followed by another hit to SQR denotes a "0," as described above. The spy can infer the key after filtering noise (for example, at time 73K cycles, the graph shows a spurious double hit for MUL, which can be ignored, given the behavior of the RSA algorithm). With ZBM, as shown in FIG. 13c, the spy always gets high latency on a reload for the lines corresponding to MUL and SQR—so the spy does not get any hits. Thus, ZBM successfully guards against this attack.

The performance of the ZBM, hardware-based mitigation systems and methods described herein was also tested to determine potential system slowdown using the ZBM system. A Pin-based x86 simulator was used to test system performance. Table 2 above shows the configuration used for the testing. The system contains 8-cores, each of which has a private instruction and data cache and a unified 256 KB L2 cache. The L3 cache is 16 MB, is shared between all the cores, and incurs a latency of 24 cycles. All cache uses a line size of 64 bytes. The measurement of the system was performed under two scenarios: (1) when the system is not under attack and executes only benign applications (common case), and (2) when the system is under an attack (uncommon case). For benign applications, a 250 million instruction slice of SPEC2006 benchmarks suite was used. The benign applications do not have a Flush+Reload pattern. An 8-core benign workload was created by randomly pairing 8 benign applications, and 100 such workloads were created. For attack scenarios, the three cases of victim-spy described above (AES, Function Watcher, and RSA) were used, and each victim-spy pair was combined with 6 benign applications to create an 8-core workload.

Figure 14:
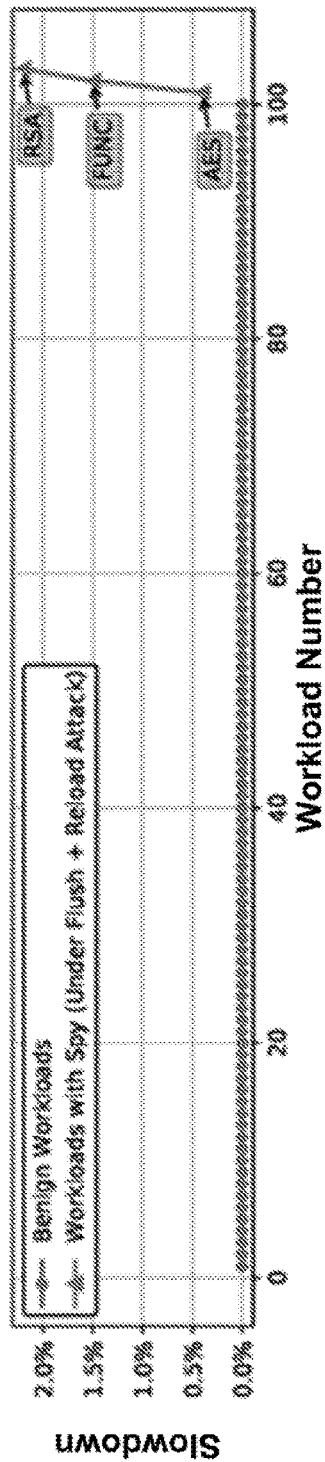
FIG. 14 is a graph showing system slowdown of a victim, spy, and benign applications while using ZBM, according to some embodiments of the present disclosure.

As described above, in some embodiments, the hardware-based mitigation described herein (e.g., ZBM) can include inflicting higher latency for a zombie-hit. For the Flush-based attacks described herein to occur, the line must be flushed, reloaded with identical content soon (before the line gets evicted from the cache), and then accessed again. Such access patterns are extremely unlikely to occur in normal (benign) applications, therefore the impact of ZBM on system performance is expected to be negligible. FIG. 14 is a graph showing system slowdown of the victim, spy, and benign applications while using ZBM. (FIG. 14 differs from FIG. 8 in that FIG. 8 depicts the slowdown when using OS-based mitigation, as described above). The graph in FIG. 14 shows the system performance for 103 workloads (100 benign+3 under attack). For calculating slowdown, the ratio of weighted speedup of the baseline to the weighted speedup of ZBM were computed. For all 100 workloads that do not have an attack, ZBM has no slowdown, whereas there is a slowdown (up to 2.2%) for the 3 workloads that contain the victim-spy pairs.

Figure 15:
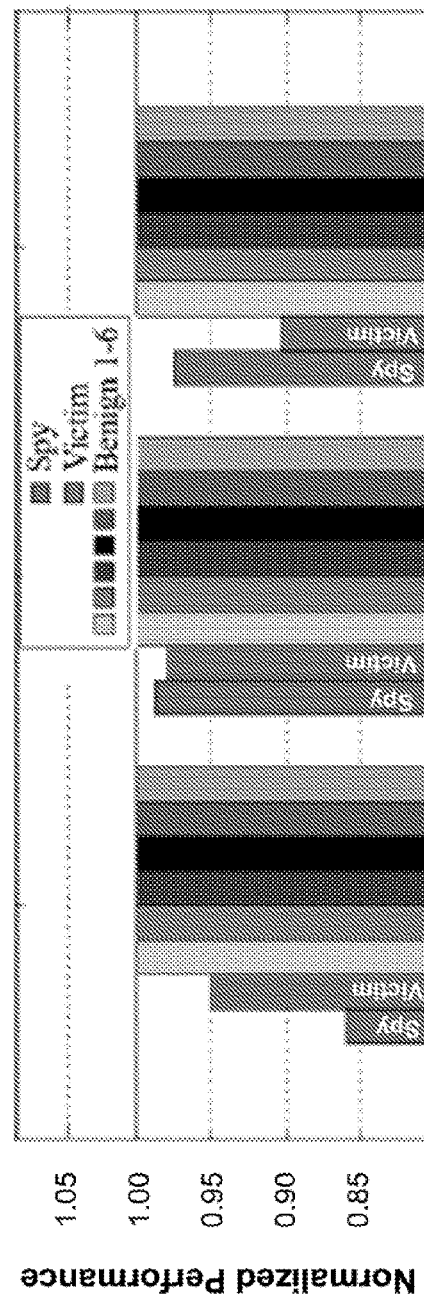
FIG. 15 is a graph showing the system performance when a victim, a spy, and six benign applications are under attack, according to some embodiments of the present disclosure.

Performance of the individual applications for the three workloads that did experience a slowdown were also compared. FIG. 15 shows the slowdown for each of the 8 applications in the 3 workloads. The workload contains a spy, a victim, and six benign bystanders. For AES, ZBM causes 16.4% slowdown for the victim and 5.3% for the spy. For Function Watcher, the slowdown is 1.2% for the victim and 2.1% for the spy. For RSA, the slowdown is 2.6% for the victim and 10.9% for the spy. Note that these slowdowns occur only under attack, when marginal slowdown can be considered acceptable to protect against the attack. The bystander applications (Benign 1-6 that are neither victim nor spy) do not see any impact on their performance.

ZBM hardware-based mitigation provides strong protection against attack while causing no performance overhead when the system is not under attack. To implement ZBM, the only storage overhead incurred is the per-line Z-bit. Therefore, to implement ZBM on a 16 MB LLC, a total storage overhead of 32 kilobytes is needed, which is less than 0.2% of the capacity of the LLC used in the present performance analyses.

The presently-described systems and methods describe Flush+Reload attacks; however, the present disclosure is not limited to protecting against these attacks. For example, the current systems and methods could also be applied to Flush+Flush attacks. The Flush+Flush attack exploits the variation in latency of the clflush instruction depending on whether or not the line is present in the cache, to infer the access of a victim. For a Flush+Flush attack to be successful, a flush must be performed on a recently flushed line, which would have its Z-bit set under the present systems and methods. In some embodiments, therefore, attack detection could include counting episodes of flush to any zombie line, with an alarm being raised when the count exceeds a threshold. On detection, the attack can be mitigated either in hardware by switching to a constant time implementation of clflush or by the OS.

The present systems and methods can also detect main-memory attacks. For example, the Row-Hammer attack induces bit-flips in memory and DRAMA exploits DRAM row-buffer timing side-channels to infer access patterns. For successful execution of these attacks, flushing the cache line is required for each iteration to ensure that the data is fetched from memory. Therefore, the systems and methods described herein can detect this entire class of attacks by tracking frequent flushes to zombie lines and invoking mitigation once the counter exceeds a threshold: DRAMA can be mitigated by switching to closed-page policy and Row-Hammer by increasing the refresh rate, for example.

The present systems and methods can also tolerate coherence-based attacks. The present systems and methods deem a line to be a zombie when it becomes invalidated due to a flush, and invalidations due to coherence operations may not create zombie lines. Therefore, read-write sharing of data between different threads of a multi-threaded program (such as ping-pong on a spin lock) does not affect the zombie status of a line. Such read-write shared pages that belong to only one process are not the target of the cross-core Flush+Reload attacks, which try to leak information across two independent processes with only OS-shared pages in common. Even though such OS-shared pages are used in a read-only mode by user processes, an attacker can use the coherence status of these lines to infer the access patterns in a multi-node system. Such attacks exploit the difference in cache latency, depending on whether the line is in Exclusive (E) or Shared (S) state. By initializing the line to state-E, the spy can infer an access by the victim, as the line would transition the line to S-state on a victim access and stay in E-state otherwise. The present systems and methods can detect such coherence-based attacks. For such attacks, initializing the line to state-E is an essential component for each attack attempt, that is achieved by executing a clflush to invalidate the line, before a subsequent load to install the line in state-E. With the present systems, the flush operation can mark the line as a zombie. Counting subsequent flushes to zombie-lines can help detect the attack. The attack can then be mitigated in hardware by enforcing constant-time accesses independent of coherence state or with OS-based solutions. These and other mitigation policies are contemplated within the present disclosure.

Figure 16:
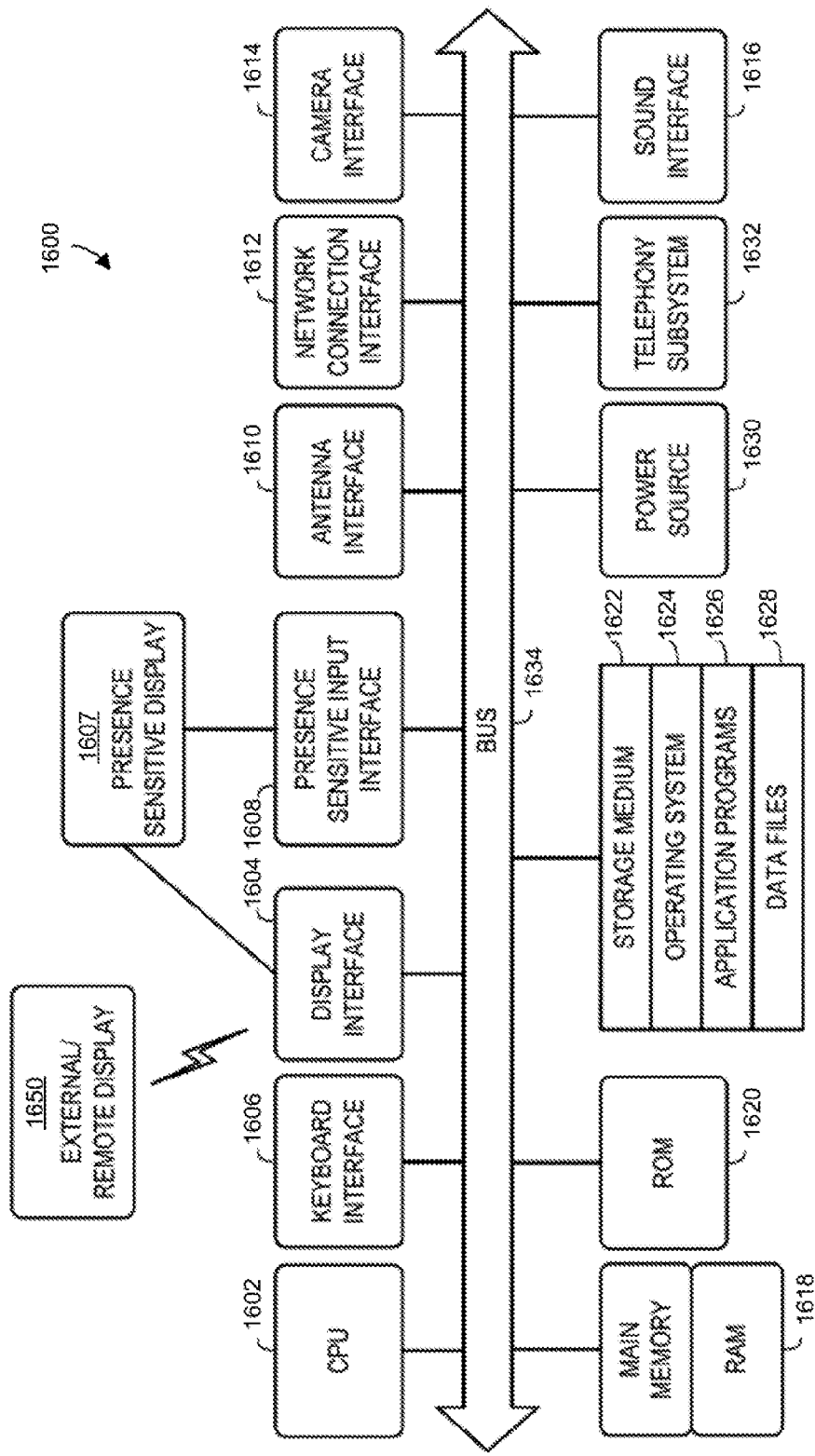
FIG. 16 is a block diagram of an illustrative computer system architecture, according to an example implementation.

Aspects of the disclosed technology may be implementing using at least some of the components illustrated in the computing device architecture 1600 of FIG. 16. As shown, the computing device architecture includes a central processing unit (CPU) 1602, where computer instructions are processed; a display interface 1604 that acts as a communication interface and provides functions for rendering video, graphics, images, and texts on the display. In certain example implementations of the disclosed technology, the display interface 1604 may be directly connected to a local display, such as a touch-screen display associated with a mobile computing device. In another example implementation, the display interface 1604 may be configured for providing data, images, and other information for an external/remote display 1650 that is not necessarily physically connected to the mobile computing device. For example, a desktop monitor may be utilized for mirroring graphics and other information that is presented on a mobile computing device. In certain example implementations, the display interface 1604 may wirelessly communicate, for example, via a Wi-Fi channel or other available network connection interface 1612 to the external/remote display 1650.

In an example implementation, the network connection interface 1612 may be configured as a communication interface and may provide functions for rendering video, graphics, images, text, other information, or any combination thereof on the display. In one example, a communication interface may include a serial port, a parallel port, a general purpose input and output (GPIO) port, a game port, a universal serial bus (USB), a micro-USB port, a high definition multimedia (HDMI) port, a video port, an audio port, a Bluetooth port, a near-field communication (NFC) port, another like communication interface, or any combination thereof. In one example, the display interface 1604 may be operatively coupled to a local display, such as a touch-screen display associated with a mobile device. In another example, the display interface 1604 may be configured to provide video, graphics, images, text, other information, or any combination thereof for an external/remote display 1650 that is not necessarily connected to the mobile computing device. In one example, a desktop monitor may be utilized for mirroring or extending graphical information that may be presented on a mobile device. In another example, the display interface 1604 may wirelessly communicate, for example, via the network connection interface 1612 such as a Wi-Fi transceiver to the external/remote display 1650.

The computing system architecture 1600 (e.g., computer device or computing device architecture) may include a keyboard interface 1606 that provides a communication interface to a keyboard. In one example implementation, the computing device architecture 1600 may include a presence-sensitive input interface 1608 for connecting to a presence-sensitive display 1607. According to certain example implementations of the disclosed technology, the presence-sensitive input interface 1608 may provide a communication interface to various devices such as a pointing device, a touch screen, a depth camera, etc. which may or may not be associated with a display.

The computing device architecture 1600 may be configured to use an input device via one or more of input/output interfaces (for example, the keyboard interface 1606, the display interface 1604, the presence-sensitive input interface 1608, network connection interface 1612, camera interface 1614, sound interface 1616, etc.) to allow a user to capture information into the computing device architecture 1600. The input device may include a mouse, a trackball, a directional pad, a track pad, a touch-verified track pad, a presence-sensitive track pad, a presence-sensitive display, a scroll wheel, a digital camera, a digital video camera, a web camera, a microphone, a sensor, a smartcard, and the like. Additionally, the input device may be integrated with the computing device architecture 1600 or may be a separate device. For example, the input device may be an accelerometer, a magnetometer, a digital camera, a microphone, and an optical sensor.

Example implementations of the computing device architecture 1600 may include an antenna interface 1610 that provides a communication interface to an antenna; a network connection interface 1612 that provides a communication interface to a network. As mentioned above, the display interface 1604 may be in communication with the network connection interface 1612, for example, to provide information for display on a remote display that is not directly connected or attached to the system. In certain implementations, a camera interface 1614 is provided that acts as a communication interface and provides functions for capturing digital images from a camera. In certain implementations, a sound interface 1616 is provided as a communication interface for converting sound into electrical signals using a microphone and for converting electrical signals into sound using a speaker. According to example implementations, a random access memory (RAM) 1618 is provided, where computer instructions and data may be stored in a volatile memory device for processing by the CPU 1602.

According to an example implementation, the computing device architecture 1600 includes a read-only memory (ROM) 1620 where invariant low-level system code or data for basic system functions such as basic input and output (IO), startup, or reception of keystrokes from a keyboard are stored in a non-volatile memory device. According to an example implementation, the computing device architecture 1600 includes a storage medium 1622 or other suitable type of memory (e.g. such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives), where the files include an operating system 1624, application programs 1626 (including, for example, a web browser application, a widget or gadget engine, and or other applications, as necessary) and data files 1628 are stored. According to an example implementation, the computing device architecture 1600 includes a power source 1630 that provides an appropriate alternating current (AC) or direct current (DC) to power components.

According to an example implementation, the computing device architecture 1600 includes and a telephony subsystem 1632 that allows the device 1600 to transmit and receive sound over a telephone network. The constituent devices and the CPU 1602 communicate with each other over a bus 1634.

According to an example implementation, the CPU 1602 has appropriate structure to be a computer processor. In one arrangement, the CPU 1602 may include more than one processing unit. The RAM 1618 interfaces with the computer bus 1634 to provide quick RAM storage to the CPU 1602 during the execution of software programs such as the operating system application programs, and device drivers. More specifically, the CPU 1602 loads computer-executable process steps from the storage medium 1622 or other media into a field of the RAM 1618 in order to execute software programs. Data may be stored in the RAM 1618, where the data may be accessed by the computer CPU 1602 during execution. In one example configuration, the device architecture 1600 includes at least 98 MB of RAM, and 256 MB of flash memory.

The storage medium 1622 itself may include a number of physical drive units, such as a redundant array of independent disks (RAID), a floppy disk drive, a flash memory, a USB flash drive, an external hard disk drive, thumb drive, pen drive, key drive, a High-Density Digital Versatile Disc (HD-DVD) optical disc drive, an internal hard disk drive, a Blu-Ray optical disc drive, or a Holographic Digital Data Storage (HDDS) optical disc drive, an external mini-dual in-line memory module (DIMM) synchronous dynamic random access memory (SDRAM), or an external micro-DIMM SDRAM. Such computer readable storage media allow a computing device to access computer-executable process steps, application programs and the like, stored on removable and non-removable memory media, to off-load data from the device or to upload data onto the device. A computer program product, such as one utilizing a communication system may be tangibly embodied in storage medium 1622, which may comprise a machine-readable storage medium.

According to one example implementation, the term computing device, as used herein, may be a CPU, or conceptualized as a CPU (for example, the CPU 1602 of FIG. 16). In this example implementation, the computing device (CPU) may be coupled, connected, and/or in communication with one or more peripheral devices, such as display. In another example implementation, the term computing device, as used herein, may refer to a mobile computing device such as a smartphone, tablet computer, or smart watch. In this example embodiment, the computing device may output content to its local display and/or speaker(s). In another example implementation, the computing device may output content to an external display device (e.g., over Wi-Fi) such as a TV or an external computing system.

In example implementations of the disclosed technology, a computing device may include any number of hardware and/or software applications that are executed to facilitate any of the operations. In example implementations, one or more IO interfaces may facilitate communication between the computing device and one or more input/output devices. For example, a universal serial bus port, a serial port, a disk drive, a CD-ROM drive, and/or one or more user interface devices, such as a display, keyboard, keypad, mouse, control panel, touch screen display, microphone, etc., may facilitate user interaction with the computing device. The one or more IO interfaces may be utilized to receive or collect data and/or user instructions from a wide variety of input devices. Received data may be processed by one or more computer processors as desired in various implementations of the disclosed technology and/or stored in one or more memory devices.

One or more network interfaces may facilitate connection of the computing device inputs and outputs to one or more suitable networks and/or connections; for example, the connections that facilitate communication with any number of sensors associated with the system. The one or more network interfaces may further facilitate connection to one or more suitable networks; for example, a local area network, a wide area network, the Internet, a cellular network, a radio frequency network, a Bluetooth enabled network, a Wi-Fi enabled network, a satellite-based network any wired network, any wireless network, etc., for communication with external devices and/or systems.

While the present disclosure has been described in connection with a plurality of exemplary aspects, as illustrated in the various figures and discussed above, it is understood that other similar aspects can be used, or modifications and additions can be made to the described aspects for performing the same function of the present disclosure without deviating therefrom. For example, in various aspects of the disclosure, methods and compositions were described according to aspects of the presently disclosed subject matter. However, other equivalent methods or composition to these described aspects are also contemplated by the teachings herein. Therefore, the present disclosure should not be limited to any single aspect, but rather construed in breadth and scope in accordance with the appended claims.

What is claimed is:

1. A method comprising:
   receiving a flush-caused invalidation at a cache line of a cache;
   in response to receiving the flush-caused invalidation:
      marking a valid bit of the cache line as invalid, wherein in an initial state prior to receiving the flush-caused invalidation, the valid bit was marked valid; and
      marking a zombie bit of the cache line as valid, wherein in the initial state the zombie bit was marked invalid, and wherein marking the zombie bit as valid identifies the cache line is an invalid zombie line;
   receiving a first access request at the invalid zombie line;
   receiving second data from a memory;
   in response to receiving the second data, either:
      when the second data is different than cache data of the cache line, marking the valid bit as valid and marking the zombie bit as invalid; or
      when the second data is equal to the cache data, marking the valid bit as valid, thereby creating a valid zombie line;
   receiving a second access request at the valid zombie line; and
   identifying the valid zombie line as under attack.

2. The method of claim 1 further comprising identifying whether the flush-caused invalidation is caused by a clflush instruction.

3. The method of claim 1 further comprising preventing the invalid zombie line from being preferentially replaced by a replacement algorithm.

4. The method of claim 1 further comprising:
   providing the zombie bit in the initial state in the cache line of the cache, wherein the cache line comprises the cache data and the valid bit in the initial state;
   identifying, via a signal associated with the cache, whether the flush-caused invalidation is caused by a clflush instruction;
   preventing, using a cache replacement policy, the invalid zombie line from being preferentially replaced by a replacement algorithm;
   subsequent to receiving the second access request at the valid zombie line, providing a latency period; and
   returning the cache data to a processor after the latency period.

5. The method of claim 4, wherein the second data is not installed in the cache.

6. The method of claim 1 further comprising tracking a number of times the valid zombie line receives the second access request and any subsequent access request.

7. The method of claim 1 further comprising tracking a number of times the cache line receives the flush-caused invalidation and any subsequent flush-caused invalidations.

8. The method of claim 1 further comprising:
   tracking, by a first hardware counter, a number of times the cache line receives the flush-caused invalidation and any subsequent flush-caused invalidations; and
   tracking, by a second hardware counter, a number of times the valid zombie line receives the second access request and any subsequent access request.

9. The method of claim 8 further comprising:
   comparing the number from the second hardware counter to the number from the first hardware counter; and
   when the two numbers are not equal, transmitting a notification to an operating system indicating the cache line is under attack.

10. The method of claim 9, wherein:
the first hardware counter is associated with a first core;
the second hardware counter is associated with a second core; and
one or more of:
   the notification includes information identifying the first core;
   the method further comprises isolating the first core in a first memory domain and isolating the second core in a second memory domain, wherein the second memory domain is separate from the first memory domain; and
   the method further comprises isolating the first core in a first time-slice and isolating the second core in a second time-slice, wherein the second time-slice is different than the first time-slice.

11. The method of claim 8 further comprising:
comparing the number from the second hardware counter to the number from the first hardware counter; and
when a difference between the two numbers reaches a predetermined threshold, transmitting a notification to an operating system indicating the cache line is under attack.

12. The method of claim 11, wherein:
the first hardware counter is associated with a first core;
the second hardware counter is associated with a second core; and
one or more of:
   the notification includes information identifying the first core;
   the method further comprises isolating the first core in a first memory domain and isolating the second core in a second memory domain, wherein the second memory domain is separate from the first memory domain; and
   the method further comprises isolating the first core in a first time-slice and isolating the second core in a second time-slice, wherein the second time-slice is different than the first time-slice.

13. A cache memory system comprising:
a memory;
a shared cache level comprising a cache line, the cache line comprising:
   a zombie bit marked invalid by default;
   cache data; and
   a valid bit marked valid by default; and
a cache controller configured to:
   mark the valid bit as invalid in response to a flush-caused invalidation;
   mark the zombie bit as valid in response to the flush-caused invalidation, thereby identifying the cache line as an invalid zombie line;
   detect a first access request at the invalid zombie line;
   retrieve second data from the memory;
   compare the second data to the cache data;
   mark the valid bit as valid when the second data is equal to the cache data, thereby creating a valid zombie line;
   detect a second access request at the valid zombie line; and
   identify the valid zombie line as under attack.

14. The system of claim 13, wherein the cache controller is further configured to:
mark the valid bit as valid when the second data is different than the cache data; and
mark the zombie bit as invalid when the second data is different than the cache data.

15. The system of claim 13, wherein the cache controller is further configured to identify whether the flush-caused invalidation is caused by a clflush instruction.

16. The system of claim 13, wherein the cache controller is further configured to prevent the invalid zombie line from being preferentially replaced by a replacement algorithm.

17. The system of claim 13, wherein the cache controller is further configured to:
provide a latency period between after the second access request at the valid zombie line; and
after providing the latency period, returning the cache data to a processor.

18. The system of claim 17, wherein the cache controller does not install the second data in the cache line.

19. The system of claim 13 further comprising a hardware counter configured to count a number of times the valid zombie line receives the second access request and any subsequent access request.

20. The system of claim 13 further comprising a hardware counter configured to count a number of times the cache line receives the flush-caused invalidation and any subsequent flush-caused invalidations.

21. The system of claim 13 further comprising:
a first hardware counter configured to count a number of times the cache line receives the flush-caused invalidation and any subsequent flush-caused invalidations; and
a second hardware counter configured to count a number of times the valid zombie line receives the second access request and any subsequent access request.

22. The system of claim 21 further comprising a processor;
wherein the cache controller is further configured to:
   compare the number from the second hardware counter to the number from the first hardware counter; and
   transmit information to the processor indicating that the two numbers are not equal; and
wherein the processor is configured to transmit a notification to an operating system indicating the cache line is under attack.

23. The system of claim 22, wherein:
the first hardware counter is associated with a first core;
the second hardware counter is associated with a second core; and
one or more of:
   the notification includes information identifying the first core;
   the cache controller is further configured to isolate the first core in a first memory domain and isolate the second core in a second memory domain, wherein the second memory domain is separate from the first memory domain; and
   the cache controller is further configured to isolate the first core in a first time-slice and isolate the second core in a second time-slice, wherein the second time-slice is different than the first time-slice.

24. The system of claim 21, further comprising a processor;
wherein the cache controller is further configured to:
   compare the number from the second hardware counter to the number from the first hardware counter; and
   transmit information to the processor indicating when a difference between the two numbers reaches a predetermined threshold; and
wherein the processor is configured to transmit a notification to an operating system indicating the cache line is under attack.

25. The system of claim 24, wherein:
the first hardware counter is associated with a first core;
the second hardware counter is associated with a second core; and
one or more of:
- the notification includes information identifying the first core;
- the cache controller is further configured to isolate the first core in a first memory domain and isolate the second core in a second memory domain, wherein the second memory domain is separate from the first memory domain; and
- the cache controller is further configured to isolate the first core in a first time-slice and isolate the second core in a second time-slice, wherein the second time-slice is different than the first time-slice.

\* \* \* \* \*